(12) United States Patent
Sako

(10) Patent No.: US 11,561,742 B2
(45) Date of Patent: Jan. 24, 2023

(54) PRINTING SYSTEM, PRINTING APPARATUS, METHOD OF CONTROLLING PRINTING APPARATUS AND INFORMATION PROCESSING APPARATUS, AND STORAGE MEDIUM FOR DETERMINING A SETTING TO USE FOR A PRINT JOB

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/841,465

(22) Filed: Apr. 6, 2020

(65) Prior Publication Data

US 2020/0326894 A1    Oct. 15, 2020

(30) Foreign Application Priority Data

Apr. 9, 2019   (JP) .............................. JP2019-074414

(51) Int. Cl.
*G06F 3/12*   (2006.01)

(52) U.S. Cl.
CPC .......... *G06F 3/1205* (2013.01); *G06F 3/1263* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2007/0103711 A1* | 5/2007 | Funakawa | G06F 3/1205 358/1.13 |
| 2009/0021757 A1* | 1/2009 | Liu | G06F 3/1207 358/1.13 |
| 2009/0021769 A1* | 1/2009 | Edmonds | G06F 3/1257 358/1.15 |
| 2009/0021771 A1 | 1/2009 | Salgado et al. | |
| 2009/0201540 A1* | 8/2009 | Morooka | G06F 3/121 358/1.15 |
| 2010/0188680 A1 | 7/2010 | Xiao | |
| 2012/0200882 A1* | 8/2012 | Ito | G06F 3/1255 358/1.15 |
| 2012/0224207 A1 | 9/2012 | Sueshige | |
| 2016/0203200 A1* | 7/2016 | Okayama | G06F 3/1285 707/620 |
| 2017/0017447 A1 | 1/2017 | Saigusa | |
| 2019/0294386 A1* | 9/2019 | Iwamoto | G06F 3/1292 |

FOREIGN PATENT DOCUMENTS

| | | |
|---|---|---|
| JP | H09-6705 A | 1/1997 |
| JP | 2019-006099 A | 1/2019 |
| WO | 2010/016234 A1 | 2/2010 |

* cited by examiner

*Primary Examiner* — Thomas D Lee

(74) *Attorney, Agent, or Firm* — Canon U.S.A., Inc. IP Division

(57) ABSTRACT

A determination is made as to whether priority is given to a print setting or a print preset by a general-purpose print service performed on an information processing apparatus. This makes it possible to resolve a conflict in settings.

18 Claims, 22 Drawing Sheets

FIG. 7

| PRESENTATION USE | ECO PRINT | PRESET NAME (PRESET IDENTIFIER) | | |
|---|---|---|---|---|
| | | | NUMBER OF COPIES (1-9999) | |
| | ● | YES (TWO-SIDED, LONG-EDGE) | TWO-SIDED PRINTING | |
| | | YES (TWO-SIDED, SHORT-EDGE) | | |
| ● | | NO | | |
| ● | ● | A4 | PAPER SIZE | |
| | | B5 | | |
| | | LETTER | | |
| | | PLAIN | PAPER TYPE | |
| | | HEAVY WIGHT | | |
| | | ENVELOPE | | |
| ● | | SINGLE | TYPE | STAPLING |
| | | DUAL | | |
| | ● | STAPLELESS STAPLING | | |
| | ● | TOP LEFT | POSITION | |
| ● | | TOP RIGHT | | |
| | | BOTTOM LEFT | | |
| | | BOTTOM RIGHT | | |
| 10 | | | STORAGE BOX NUMBER (1-99) | |

FIG. 10

Get-Printer-Attributes Request

```
RequestAttributes =   (
   {
      "attributes-charset" = "utf-8";
      "attributes-natural-language" = en;
      "printer-uri" = "ipp://x.x.x.x:631/ipp/print";
   }
);
```

Get-Printer-Attributes Response  FIG. 11

```
    ResponseAttributes =    (
      {
        "attributes-charset" = "utf-8";
        "attributes-natural-language" = "en-us";
      },
      {
1101  { "copies-supported" =          (
           lower = 1;
           upper = 9999;
        );

1102  { "sides-supported" =         (
           "one-sided", "two-sided-long-edge", "two-sided-short-edge"
        );

1103  { "media-supported" =         (
           "iso_a4_210x2117mm","jis_b5_182x257mm","na_letter_8.5x11in",
        );

1104  { "media-type-supported" =          (
           "plain", "heavyweight", "envelope",
        );

"finishings-col-database" =        (
                        {       "finishing-template" = staple;              },
                        {       "finishing-template" = "staple-top-left";   },
                        {       "finishing-template" = "staple-bottom-left"; },
                        {       "finishing-template" = "staple-top-right";  },
                        {       "finishing-template" = "staple-bottom-right"; },
1105                    {       "finishing-template" = "staple-dual-left";  },
                        {       "finishing-template" = "staple-dual-top";   },
                        {       "finishing-template" = "staple-dual-right"; },
                        {       "finishing-template" = "staple-dual-bottom"; },
                        {       "finishing-template" = none;                }
        );

"job-presets-supported" =        (
                  {
                     preset-name = "eco print";
                     sides = "two-sided-long-edge";
                     media = "iso_a4_210x2117mm";
                  }, {
1106              preset-name = "presentation use";
                     sides = "one-sided";
                     media = "iso_a4_210x2117mm";
                     finishing-template = "staple-top-right";
                  }
        );
      }
    );
```

FIG. 12

Create-Job Request

```
RequestAttributes =   (
    {
        "attributes-charset" = "utf-8";
        "attributes-natural-language" = en;
        "printer-uri" ="ipp://x.x.x.x:631/ipp/print";
        "requesting-user-name" = suzuki;
    },
    {
        copies = 12;
        sides = "two-sided-long-edge";
        media = iso_a4_212x297mm";
        preset-name = "eco print";
    }
);
```
— 1201

(1211: copies/sides/media/preset-name block)

Create-Job Response

```
ResponseAttributes =   (
    {
        "attributes-charset" = "utf-8";
        "attributes-natural-language" = "en-us";
    },
    {
        "job-id" = 1;
        "job-state" = 3;
        "job-state-reasons" = "job-incoming";
        "job-uri" = "ipp://x.x.x.x:631/ipp/print/job-1";
        "job-uuid" = "urn:uuid:80159ffe-a3a2-11e5-8000-d8492fc1a675";
    }
);
```
— 1202

(1212: job-id/job-state/job-state-reasons/job-uri block)

Send-Document Request

```
RequestAttributes =   (
    {
        "attributes-charset" = "utf-8";
        "attributes-natural-language" = en;
        compression = none;
        "document-format" = "image/urf";
        "job-id" = 1;
        "last-document" = 1;
        "printer-uri" = "ipp://x.x.x.x:631/ipp/print";
        "requesting-user-name" = suzuki;
    }
);

[ACTUAL PRINT DATA IS DESCRIBED BELOW]
```
— 1203

(1213: attributes block)

FIG. 17

Create-Job Request — 1701

```
RequestAttributes = (
  {
    "attributes-charset" = "utf-8";
    "attributes-natural-language" = en;
    "printer-uri" ="ipp://x.x.x.x:631/ipp/print";
    "requesting-user-name" = suzuki;
  },
  {
    sides = "two-sided-short-edge";
    media = iso_a4_210x297mm";           ⎫
    finishing-template" = "staple-top-left"; ⎬ 1702
    preset-name = "eco print";            ⎭
  }
);
```

Create-Job Request — 1711

```
RequestAttributes = (
  {
    "attributes-charset" = "utf-8";
    "attributes-natural-language" = en;
    "printer-uri" ="ipp://x.x.x.x:631/ipp/print";
    "requesting-user-name" = suzuki;
  },
  {
    copies = 10;
    sides = "two-sided-long-edge";
    media = iso_a4_210x297mm";              ⎫ 1712
    finishing-template" = "staple-top-left"; ⎬
    preset-name = "presentation use";        ⎭
  }
);
```

FIG. 21

PRINTING SYSTEM, PRINTING APPARATUS, METHOD OF CONTROLLING PRINTING APPARATUS AND INFORMATION PROCESSING APPARATUS, AND STORAGE MEDIUM FOR DETERMINING A SETTING TO USE FOR A PRINT JOB

BACKGROUND

Field of the Disclosure

The present disclosure relates to a printing system, a printing apparatus, and a method of controlling a printing apparatus and an information processing apparatus, and a storage medium.

Description of the Related Art

In recent years, it has been known to generate, by an information processing apparatus, print data without using a printer driver (or a print application). For example, it is known to generate print data by a general-purpose print service provided as a function of an operating system (OS) operating on an information processing apparatus or by a general-purpose print service provided by a print server on a cloud or the like, and to transmit the resultant generated print data to a printing apparatus. In such a general-purpose print service, a network protocol (IPP, Internet Printing Protocol) for transmitting print data to a printing apparatus and executing printing is implemented, whereby the printing apparatus and the information processing apparatus communicate according to the protocol thereby achieving a printing process. In such a general-purpose print service, in order to cope with various printing apparatuses, it is allowed to set only print settings that are shared between different types of printing apparatuses. Therefore, there is a possibility that a function such as a user's favorite printing setting used in a routine job, which is provided by a printer driver or the like, cannot be set on a print setting screen provided by a general-purpose print service.

Japanese Patent Laid-Open No. 2019-6099 discloses a technique in which a user's favorite print setting is registered in a printing apparatus (hereinafter referred to as a print preset), and, when print data is generated using a general-purpose print service, the print preset is reflected in print settings provided by the general-purpose print service performed on the information processing apparatus. By using this method, it is possible to use a favorite print setting in routine also when a print setting is performed via a general-purpose print service.

However, in the method disclosed in Japanese Patent Laid-Open No. 2019-6099 in which a print preset is reflected, when the print setting provided by the general-purpose print service performed on the information processing apparatus and the print preset setting include the same setting item, if the setting item is set differently, a conflict occurs. There is no means for determining which setting is given priority when the settings conflict and thus the setting conflict cannot be resolved.

SUMMARY

Embodiments of the present disclosure provide a printing apparatus configured to communicate with an information processing apparatus. The printing apparatus includes one or more processors; and at least one memory storing executable instructions, which when executed by the one or more processors, cause the printing apparatus to perform operations including registering first setting information related to printing, in response to an acquisition request from the information processing apparatus, transmitting identification information of the first setting information to the information processing apparatus, receiving second setting information related to printing set on the information processing apparatus and the identification information from the information processing apparatus, generating a print job based on the second setting information and the first setting information corresponding to the identification information, executing the print job, and determining, in a case where a setting included in the first setting information and a setting included in the second setting information conflict with each other, whether priority is to be given to the setting included in the first setting information or the setting included in the second setting information. Moreover, in the case where the setting included in the first setting information and the setting included in the second setting information conflict with each other, the print job is generated in accordance with the determination. According to some embodiments, a system is provided including an information processing apparatus and a printing apparatus such as described above. The information processing apparatus may perform operations comprising transmitting the acquisition request for the first setting information to the printing apparatus, and transmitting second setting information related to printing set on the information processing apparatus and the identification information to the printing apparatus.

Further features of the present disclosure will become apparent from the following description of embodiments with reference to the attached drawings.

BRIEF DESCRIPTION OF THE DRAWINGS

FIG. 7 is a diagram illustrating print preset setting information managed by a multifunction peripheral according to the first embodiment.

FIG. 10 is a diagram illustrating a printer information request which is transmitted by a portable terminal to a multifunction peripheral according to the first embodiment.

FIG. 11 is a diagram illustrating a printer information request which is transmitted by a portable terminal to a multifunction peripheral according to the first embodiment.

FIG. 12 is a diagram illustrating a print job generation request, a print job generation response, and a print request transmitted and received between a portable terminal and a multifunction peripheral according to the first embodiment.

FIG. 17 is a diagram illustrating a print job generation request which is transmitted by a portable terminal to a multifunction peripheral according to the first embodiment.

FIG. 21 is a diagram illustrating an operation screen for performing a print preset setting on a multifunction peripheral according to a fourth embodiment.

DESCRIPTION OF THE EMBODIMENTS

Embodiments of the present disclosure will be described below with reference to the drawings.

Note that the scope of the present disclosure is not limited by the embodiments described below, and a combination of all features described in the embodiments described below does not necessarily need to be implemented. Each of the embodiments of the present disclosure described below can be implemented solely or as a combination of a plurality of the embodiments or features thereof where necessary or where the combination of elements or features from individual embodiments in a single embodiment is beneficial.

First Embodiment

Figure 1:
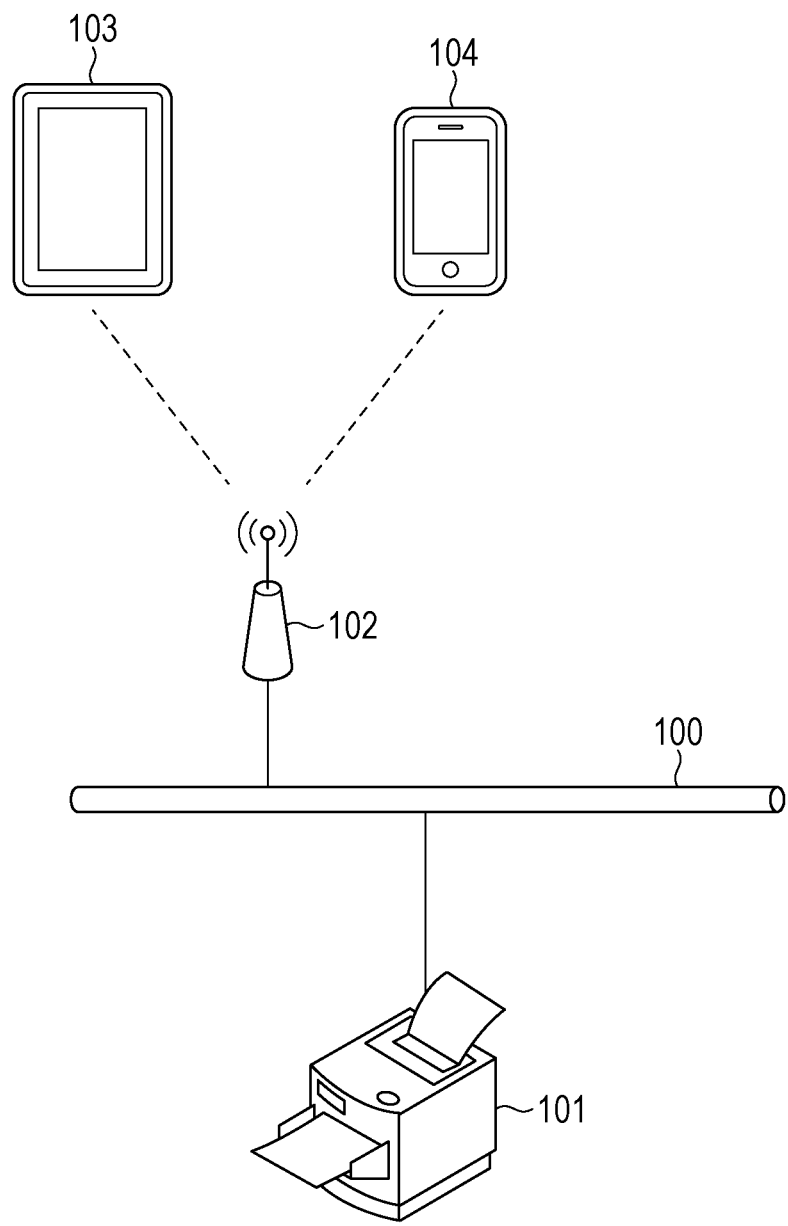
FIG. 1 is a schematic diagram illustrating a configuration of a printing system according to an embodiment.

FIG. 1 is a diagram illustrating a configuration of a printing system according to an embodiment of the present disclosure. A multifunction peripheral 101 and an AP (access point) 102 are communicably connected to each other via a LAN (Local Area Network) 100. In the first embodiment, as an example of a printing apparatus, a multifunction peripheral 101 is explained which has a scanning function, a printing function, a facsimile transmission/reception function, a box function, and/or the like. Although the multifunction peripheral is explained below as an example, the present disclosure is not limited to this example. The present disclosure may also be applied to a single-function apparatus if the apparatus has a printing function. Furthermore, as an example of an information processing apparatus, an information processing terminal such as an information processing terminal 103 or 104 is explained. The processing terminal may be a tablet device, a smartphone, or the like. This information processing terminal is capable of communicating with the multifunction peripheral 101 on the LAN 100 via the AP 102. In the first embodiment, by way of example, it is assumed that the printing system is configured in the above-described manner, but the present disclosure is not limited to this example. What is necessary is only that at least one or more information processing apparatuses and the multifunction peripheral are communicably connected via a network. The network may be of a wireless or wired type.

First, the multifunction peripheral 101 is described. The multifunction peripheral 101 has a reading function of reading an image on a document and a printing function of printing an image on a sheet (a recording medium). The multifunction peripheral 101 is capable of executing a printing process based on print data received via a network.

Figure 2:
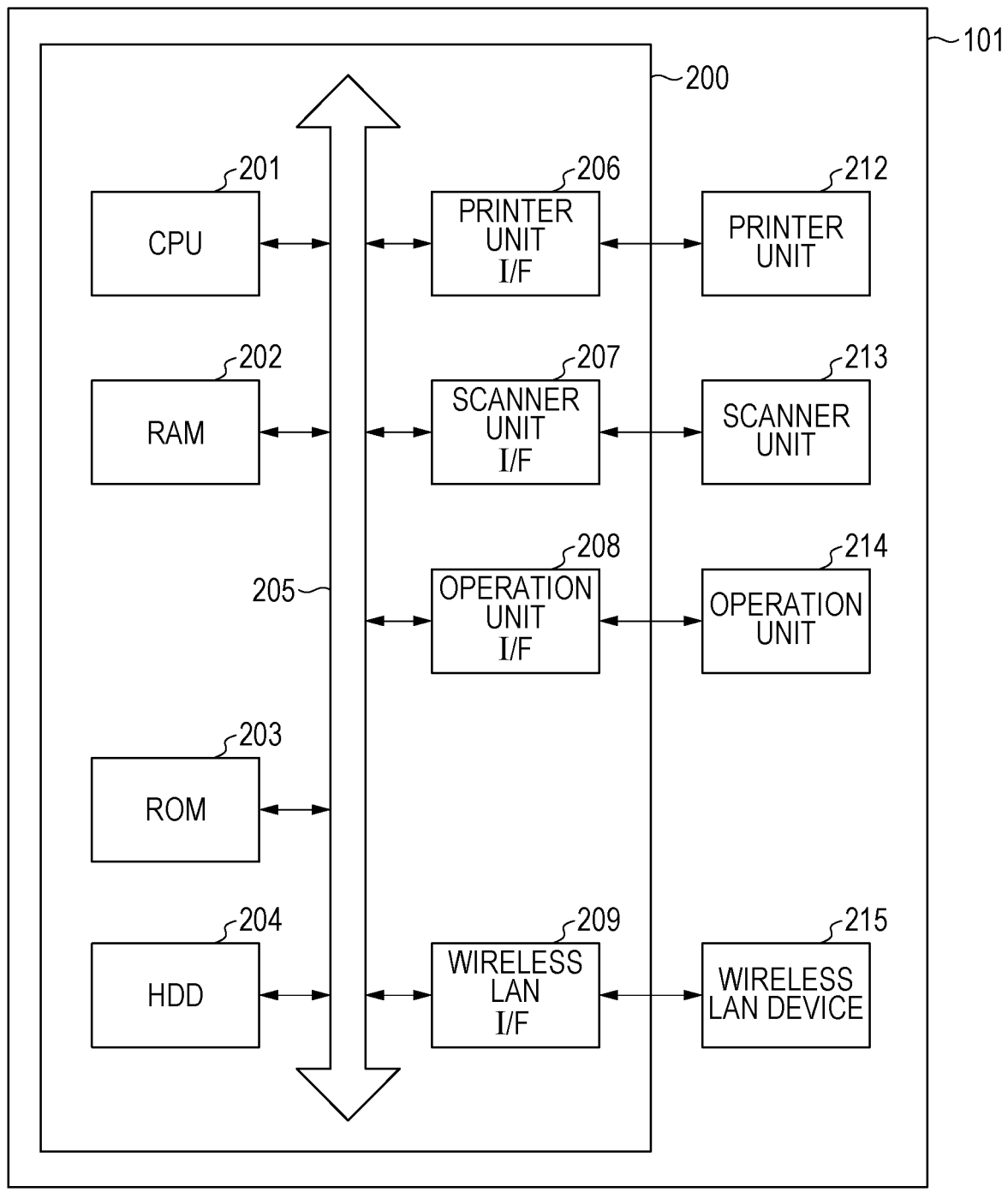
FIG. 2 is a diagram illustrating a hardware configuration of a multifunction peripheral according to an embodiment.

FIG. 2 is a block diagram illustrating a hardware configuration of the multifunction peripheral 101 according to the present embodiment. A control unit 200 including a CPU 201 controls an operation of the whole multifunction peripheral 101. The CPU 201 reads out a control program stored in a ROM 203 and performs various controls such as communication control. A RAM 202 is used by the CPU 201 as a temporary storage area such as a main memory, a work area, or the like. An HDD 204 stores data, various programs, or various information tables.

A printer unit I/F 206 serves as an interface for outputting an image signal to a printer unit 212 (printer engine). A scanner I/F 207 serves as an interface for inputting a read image signal from the scanner unit 213 (a scanner engine). The CPU 201 processes an image signal input from the scanner unit I/F 207 and outputs a resultant signal as a recording image signal to the printer unit I/F 206.

An operation unit I/F 208 connects an operation unit 214 and the control unit 200. The operation unit 214 includes a liquid crystal display unit having a touch panel function, a keyboard, and the like.

A wireless LAN I/F 209 controls a wireless LAN device 215 to wirelessly transmit information to an external terminal such as the portable terminal 103 or receive various information from the external apparatus.

Each block in the control unit 200 is connected to each other via a system bus 205.

Figure 3:
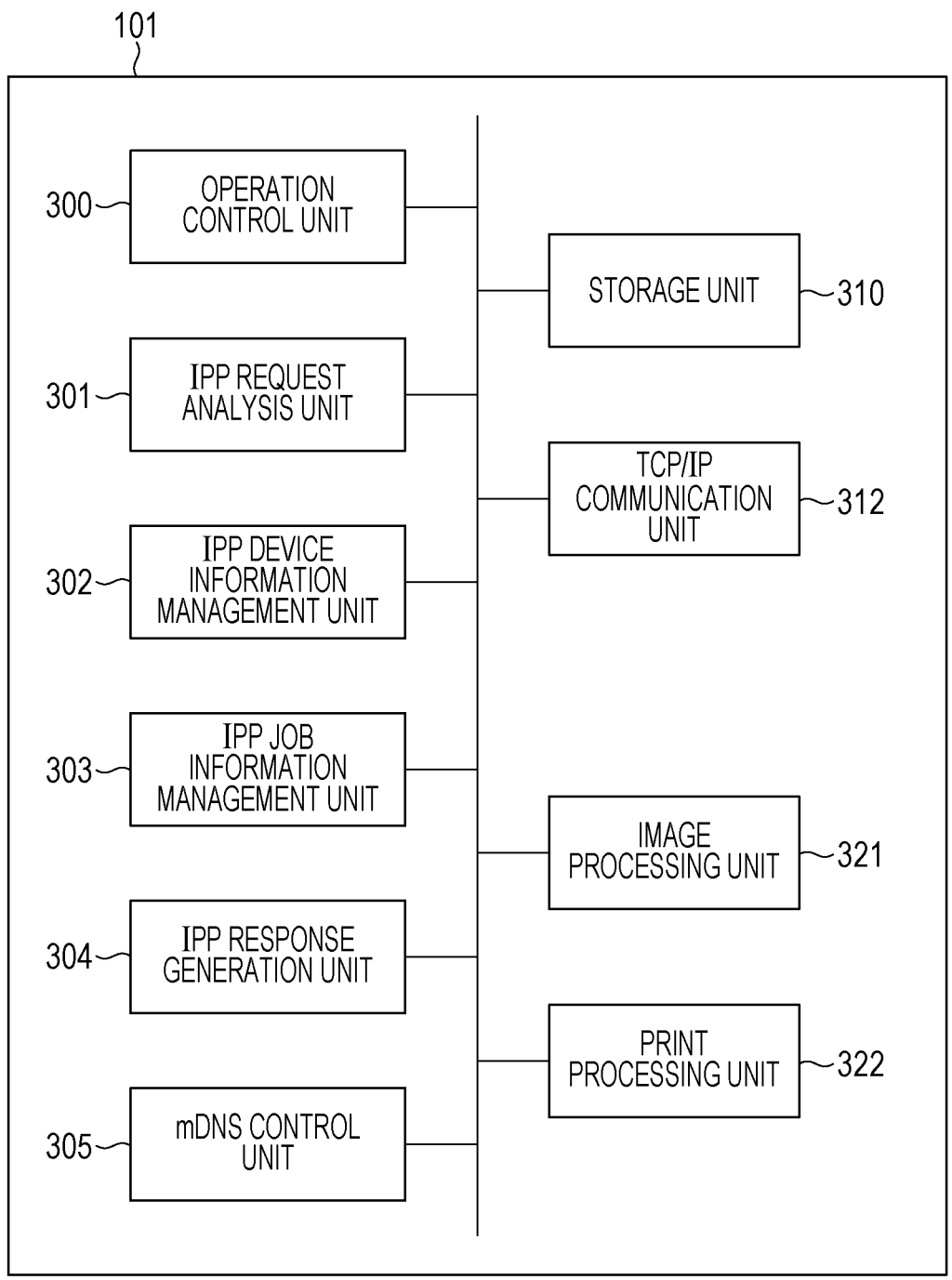
FIG. 3 is a diagram illustrating a software configuration of a multifunction peripheral according to an embodiment.

FIG. 3 is a diagram illustrating a software configuration of the multifunction peripheral 101. Each function illustrated in FIG. 3 is realized by the CPU 201 of the multifunction peripheral 101 by reading and executing a control program stored in the ROM 203 or the HDD 204.

An operation control unit 300 controls the operation unit 214. The operation control unit 300 displays an operation menu on the operation unit 214, and waits for an instruction to be input by a user. When the instruction is input, a content of the instruction is notified to another function unit, and an instruction result is displayed on the operation unit 214.

An IPP (Internet Printing Protocol) request analysis unit 301 analyzes an IPP request.

The IPP device information management unit 302 manages device information managed by IPP. Specifically, it manages device information that is returned in response to receiving Get-Printer-Attributes, which is an IPP request.

An IPP job information management unit 303 manages job information received by IPP.

The IPP response generation unit 304 generates an IPP response.

An mDNS control unit 305 controls an mDNS protocol.

The storage unit 310 stores or reads out specified data into or from the ROM 203 or the HDD 204 or in accordance with an instruction given from another function unit.

A TCP/IP communication unit 312 controls communication using the TCP/IP protocol. The TCP/IP protocol is used in the IPP protocol and the like.

An image processing unit 321 performs a process of rendering a print job into image data for printing.

A print processing unit 322 performs a process of transmitting image data rendered by the image processing unit 321 to the printer unit 212 via the printer I/F 206 as an image signal and printing the image data.

Figure 4:
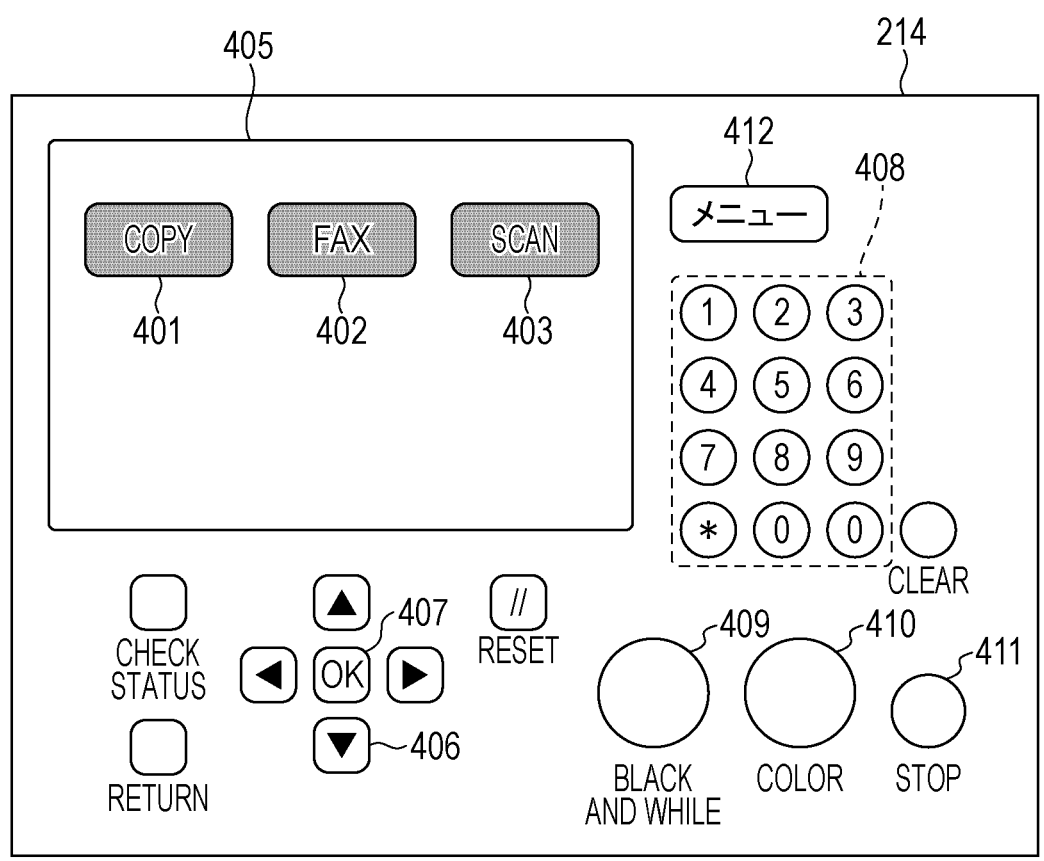
FIG. 4 is a diagram illustrating an operation panel of a multifunction peripheral according to an embodiment.

FIG. 4 is a diagram illustrating an operation unit 214 of the multifunction peripheral 101. A display panel 405 is a display panel using an LCD or the like. A copy button 401 is a button that is pressed to perform copying using the multifunction peripheral 101. When this button is pressed, a copy operation screen is displayed on the display panel 405. A FAX button 402 is a button that is pressed to perform a facsimile operation using the multifunction peripheral 101. When the FAX button 402 is pressed, a FAX operation screen is displayed on the display panel 405. A scan button 403 is a button that is pressed to perform scanning using the multifunction peripheral 101. When this button is pressed, a scan operation screen is displayed on the display panel 405. A numeric keypad 408 is used to input a number and the like. An OK key 407 is used to finally determine contents displayed on the display panel 405. Direction keys 406 are used, for example, to move a selection target displayed on the display panel 405. A black-and-white copy key 409 and a color copy key 410 are respectively used when executing a black-and-white copy and a color copy. A stop key 411 is used to stop processing. A menu key 412 is used to display a menu screen for setting the multifunction peripheral 101.

Operations of the multifunction peripheral 101 and the information processing apparatus 103 are described below with reference to five examples.

Figure 5:
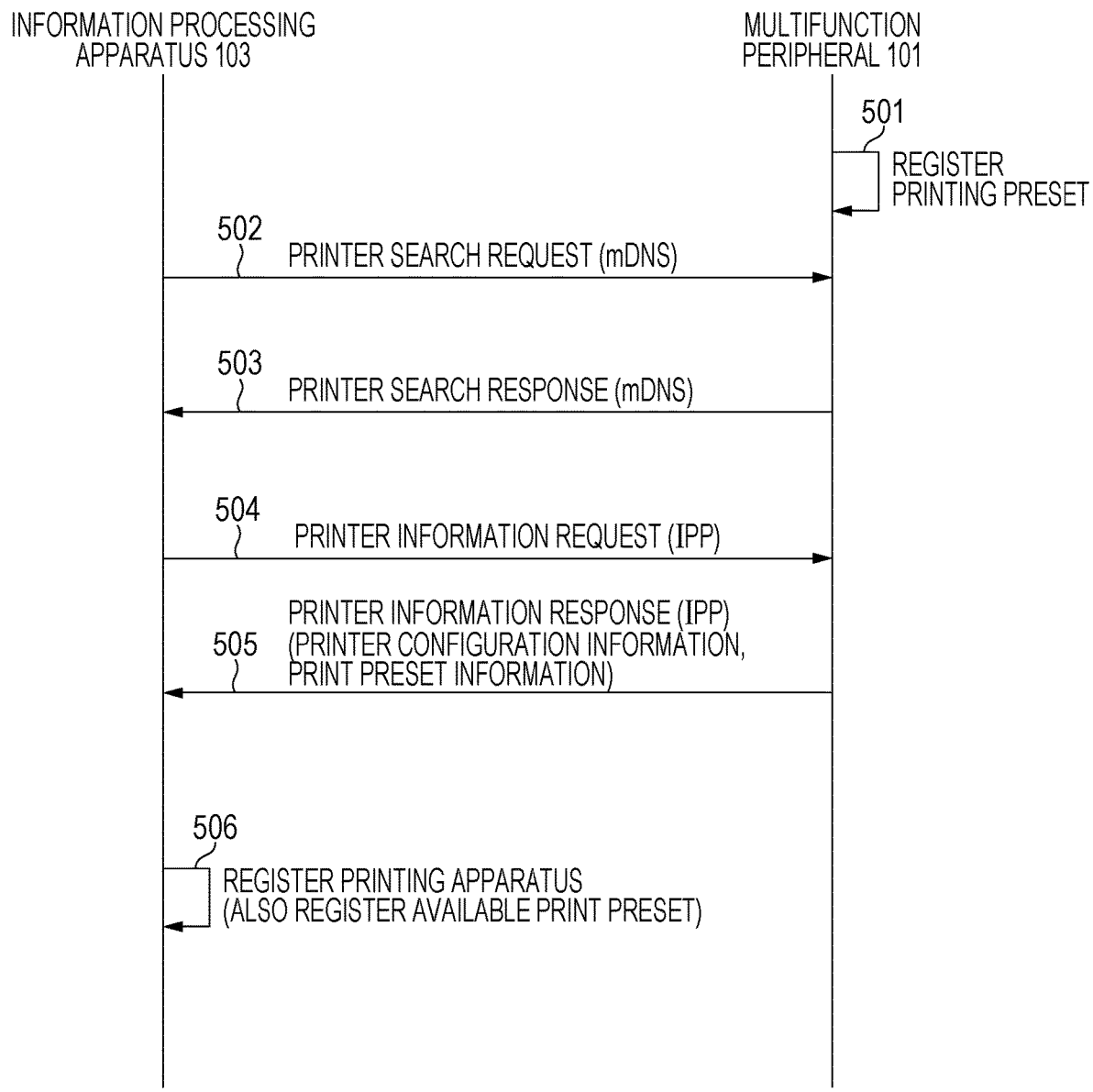
FIG. 5 is a sequence diagram illustrating a control performed by a portable terminal to search for a multifunction peripheral according to a first embodiment.

FIG. 5 is a sequence diagram illustrating control performed when the information processing apparatus 103 searches for the multifunction peripheral 101 and acquires information on the multifunction peripheral 101 according to the first embodiment. In the example described below, it is assumed by way of example that Multicast DNS (mDNS) is used as a printer search protocol between the information processing apparatus 103 and the multifunction peripheral 101. Furthermore, it is assumed by way of example that Internet Printing Protocol (IPP) is used as a print protocol.

A user registers a print preset in the multifunction peripheral 101 (501). The print preset is a print setting made according to a desire of the user, and is registered in the multifunction peripheral 101. In the print preset, it is allowed to set detailed print settings (for example, specifying a staple position, etc.) specific to the multifunction peripheral, which are not allowed in general-purpose print service.

The information processing apparatus 103 transmits a printer search request 502 using mDNS. A specific content of the printer search request 502 is an inquiry as to whether or not IPP is supported. Although the printer search request 502 is transmitted to the multifunction peripheral 101 in FIG. 5, if there are a plurality of devices on the same network, the printer search request 502 is transmitted to the plurality of devices. When the multifunction peripheral 101 receives the printer search request 502, the multifunction peripheral 101 returns, as a response, a printer search response 503. A specific content of the printer search response 503 is a response indicating whether or not IPP is supported.

The information processing apparatus 103 transmits a printer information request 504 to the multifunction peripheral 101 using IPP. The printer information request 504 is a request for acquiring printer information, and specific contents thereof will be described later with reference to FIG. 10. When the multifunction peripheral 101 receives the printer information request 504, the multifunction peripheral 101 returns, as a response, a printer information response 505. The printer information response 505 includes printer configuration information and print preset information.

Upon receiving the printer information response 505, the information processing apparatus 103 registers the multifunction peripheral 101 as a printing apparatus in the information processing apparatus 103 by a user operation in 506. In this process, functions to be registered as functions executable by the multifunction peripheral 101 are determined based on the received printer configuration information. In a case where print preset information is included, it is registered as a print preset executable by the multifunction peripheral 101. Specific contents of the printer information response 505 will be described later with reference to FIG. 11.

Figure 6:
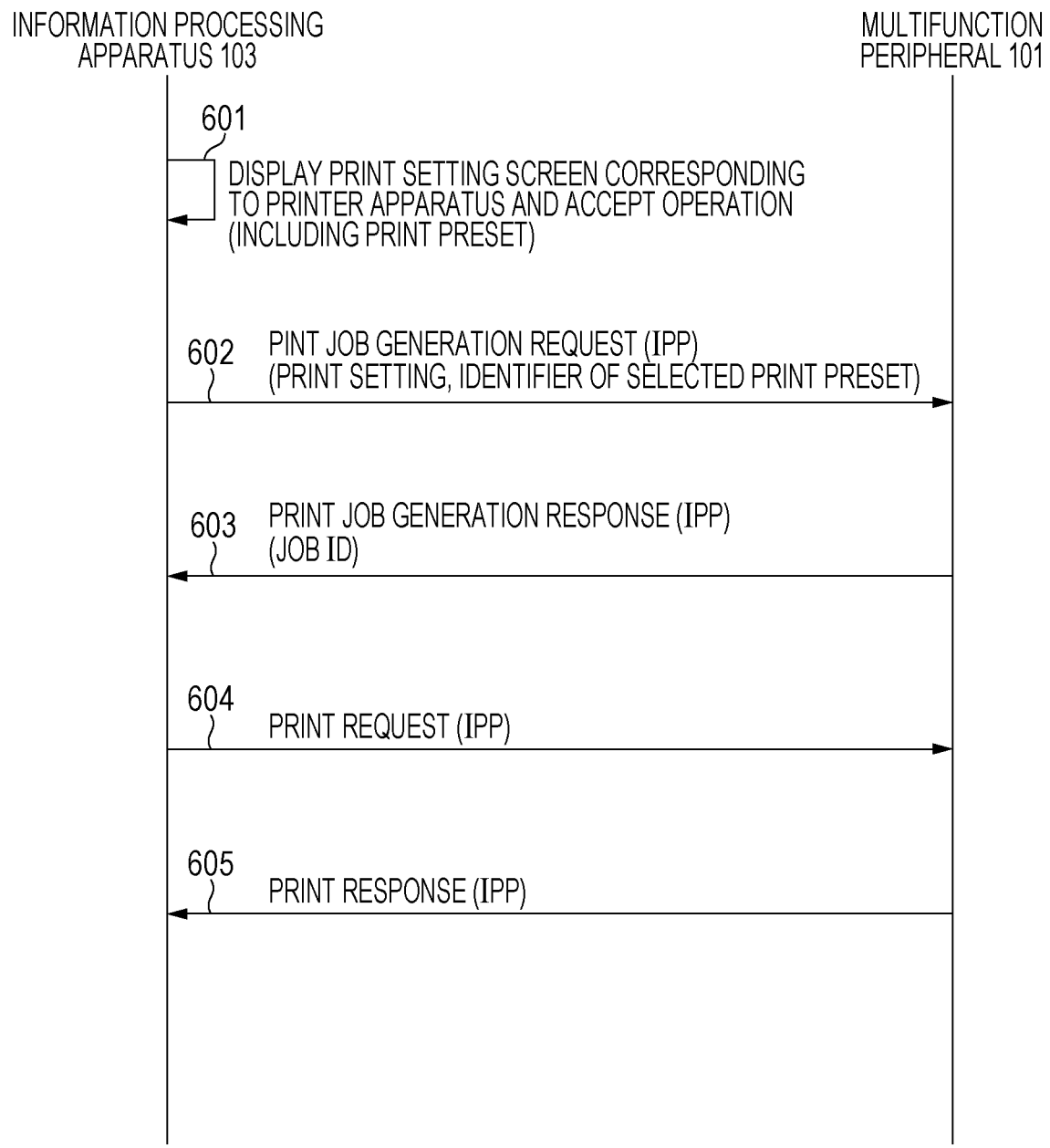
FIG. 6 is a sequence diagram illustrating a control performed by a portable terminal to transmit a print job based on a print preset to a multifunction peripheral according to the first embodiment.

FIG. 6 is a sequence diagram illustrating a control performed when the information processing apparatus 103 transmits a print job based on a print preset to a multifunction peripheral 101 according to the first embodiment.

A user operates the information processing apparatus 103 to select a desired document, and selects the multifunction peripheral 101 as a printing apparatus. In response to the operation, the information processing apparatus 103 displays, in 601, a print setting screen for performing printing on the multifunction peripheral 101. On the print setting screen, it is allowed to select a print preset in addition to normal print settings. The normal print setting is a print setting that is common among printers of different types in a general-purpose print service, and that can be displayed on the information processing apparatus.

On the information processing apparatus 103, a normal print setting, a print preset selection instruction, and a print instruction are accepted. According to the instructions, the information processing apparatus 103 transmits a print job generation request 602 to the multifunction peripheral 101. The print job generation request 602 includes normal print setting information and identification information indicating the selected print preset.

Upon receiving the print job generation request 602, the multifunction peripheral 101 generates a job based on the received normal print settings and print preset information. A job ID is transmitted to the information processing apparatus 103 in a print job generation response 603.

Subsequently, the information processing apparatus 103 transmits a print request 604 to the multifunction peripheral 101. The print request 604 includes print data and job information. Upon receiving the print request 604, the multifunction peripheral 101 stores the print data, and transmits a print response 605 indicating that the print data has been received. Then, the multifunction peripheral 101 prints the received print data based on the job information.

Specific contents of the print job generation request 602, the print job generation response 603, and the print request 604 will be described later with reference to FIG. 12.

FIG. 7 is a diagram illustrating print preset settings managed and registered on the multifunction peripheral 101 according to the first embodiment. In this example, a setting "eco print" and a setting "presentation use" are defined. In "eco print", settings are defined such that two-sided printing is "yes (two-sided, long-edge)", the paper size is "A4", the stapling type is "stapleless stapling", and the stapling position is "top left".

In "presentation use", settings are defined such that two-sided printing is "no", the paper size is "A4", the stapling type is "single", the stapling position is "top right", and the storage box number is "10".

Figure 8:
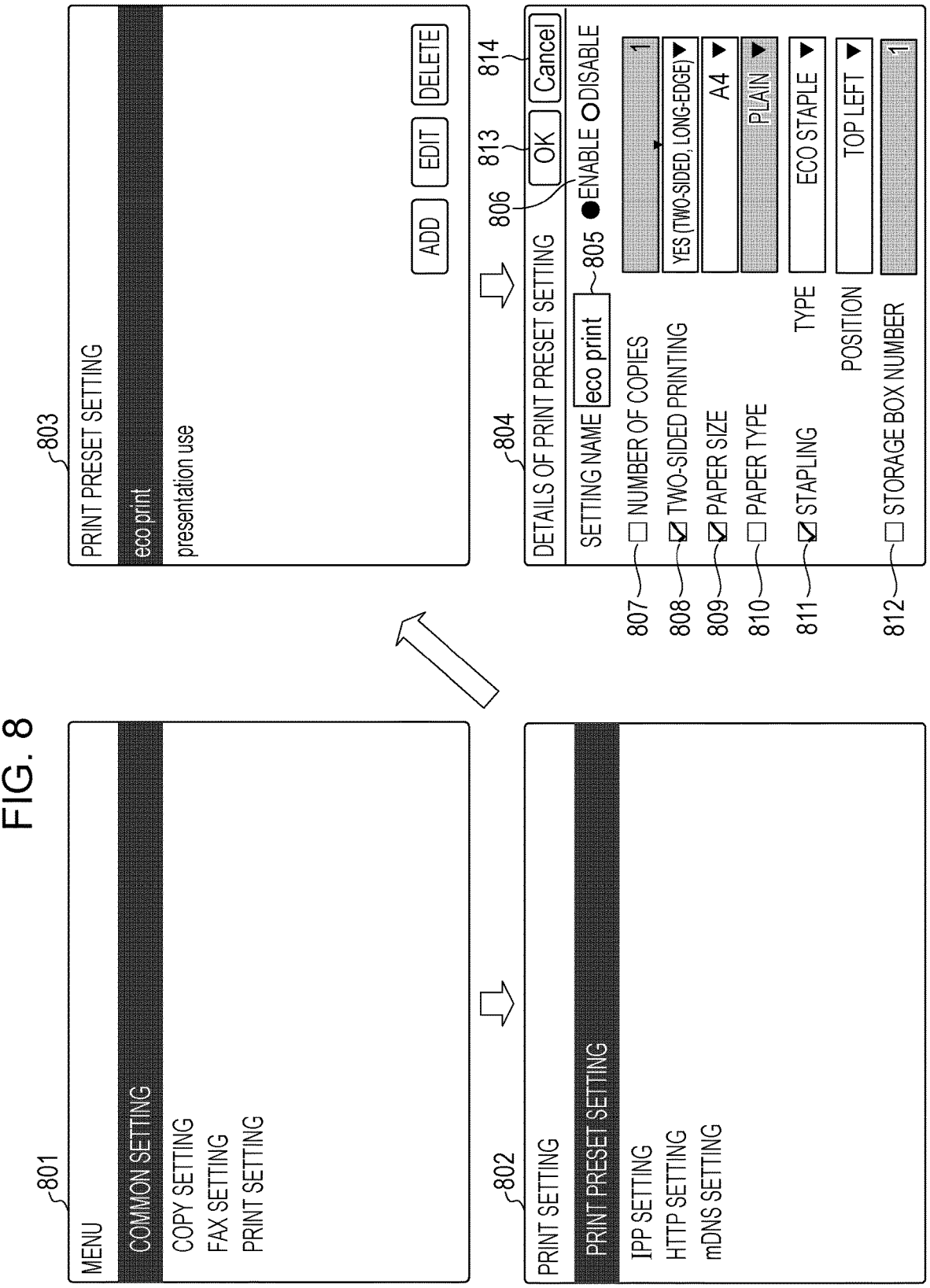
FIG. 8 is a diagram illustrating an operation screen for performing print preset setting on a multifunction peripheral according to the first embodiment.

FIG. 8 is a diagram illustrating an operation screen for performing print preset setting on the multifunction peripheral 101 according to the first embodiment. This operation screen is displayed in 501 in FIG. 5.

When the menu key 412 is pressed on the operation unit 214, the operation control unit 300 of the multifunction peripheral 101 displays a menu screen 801 for setting the multifunction peripheral 101. When "print setting" is selected on the menu screen 801, the operation control unit 300 displays a print setting screen 802. When "print preset setting" is selected on the print setting screen 802, the operation control unit 300 reads the print preset settings registered in the storage unit 305, and displays the read print preset names on the print preset setting screen 803. The operation control unit 300 displays an add button for adding a print preset, an edit button for editing the read print preset, and a delete button for deleting the read print preset on the print preset setting screen 803. When the delete button is pressed, the operation control unit 300 deletes the selected print preset from the storage unit 305. When an add button or an edit button is pressed, a details of print preset setting screen 804 is displayed. In a case where the add button is pressed, an initial value of each parameter is displayed. In a case where the edit button is pressed, the parameters based on the setting of a selected print preset are displayed. As for a setting name 805, a name (identification information) of the print preset is displayed. Enable and disable radio buttons 806 indicate whether the print preset is enabled or disabled. In the number of copies 807, a check box indicating whether to specify the number of copies and a specific number of copies are displayed. In two-sided printing 808, a check box indicating whether to specify two-sided printing and specific two-sided print settings are displayed. In paper size 809, a check box indicating whether to specify a paper size and a specific paper size are displayed. In paper type 810, a check box indicating whether to specify a paper type and a specific paper type are displayed. In stapling 811, a check box indicating whether or not to specify stapling and a specific stapling type and position are displayed. In storage box number 812, a check box indicating whether to specify a storage box number and a specific storage box number are displayed. Each setting is not simply displayed but is allowed to be changed according to an operation performed by a user.

When an OK button 813 is pressed, the operation control unit 300 registers the set print preset settings in the storage unit 305, and displays a print preset setting screen 803. When a cancel button 814 is pressed, the operation control unit 300 discards the operation content on the screen and displays the print preset setting screen 803.

Figure 9:
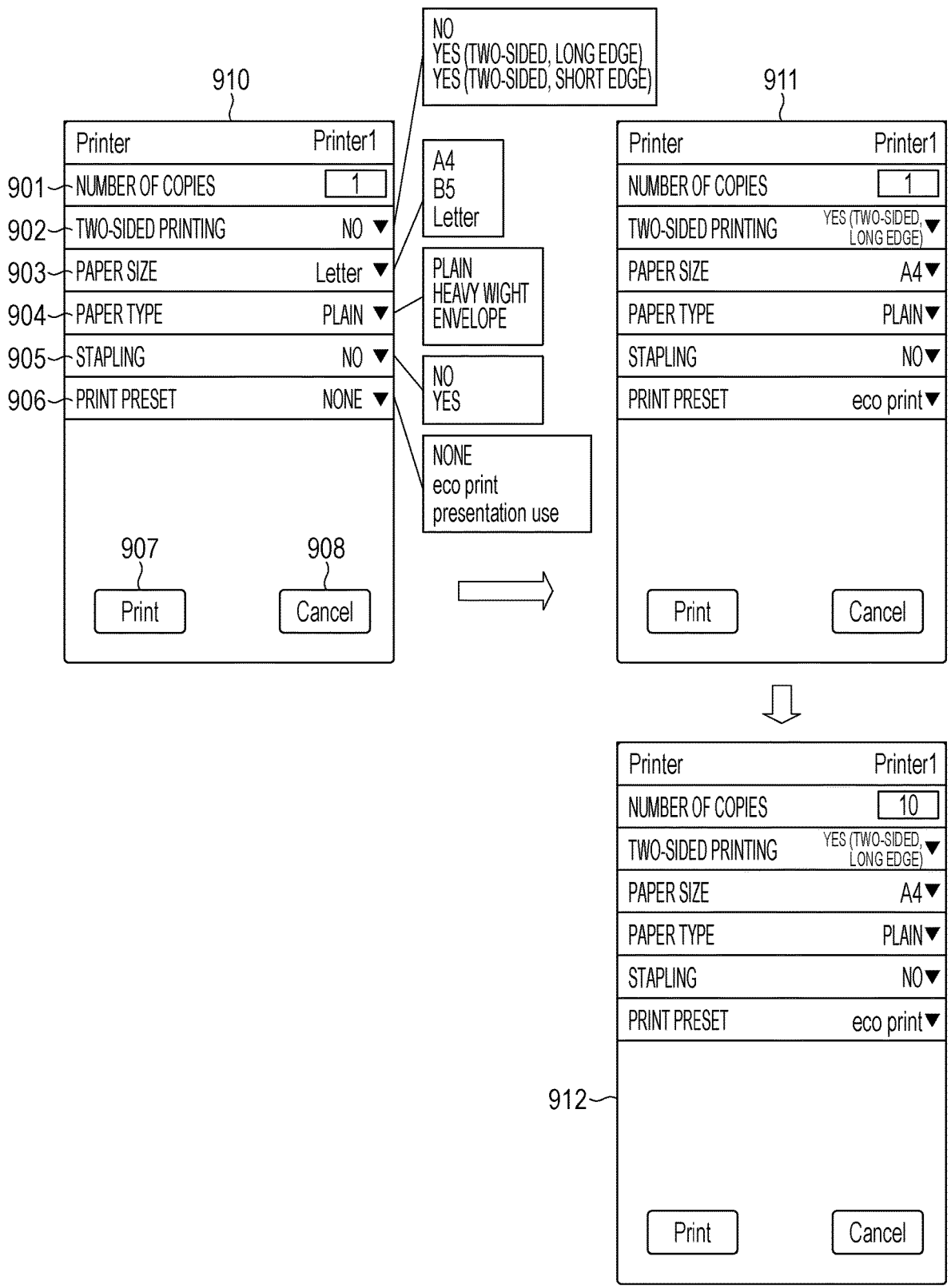
FIG. 9 is a diagram illustrating an operation screen for performing print setting on a portable terminal according to the first embodiment.

FIG. 9 is a diagram illustrating an operation screen for normal print settings on the information processing apparatus 103 according to the first embodiment. This operation screen is displayed in 601 in FIG. 6.

A user selects a desired document for which to make print settings on the information processing apparatus 103, and selects the multifunction peripheral 101 as a printing apparatus. The information processing apparatus 103 displays a print setting screen 910 based on the selection made above. On the print setting screen 910, it is allowed to select print options supported by the multifunction peripheral 101. In the number of copies 901, it is allowed to specify the number of copies by inputting the number. In two-sided printing 902, a setting in terms of double-sided printing is displayed. It is allowed to specify "no", "yes (two-sided, long-edge)" or "yes (two-sided, short-edge)". In paper size 903, a paper size setting is displayed. It is allowed to one of A4, B5, and letter. In paper type 904, a paper type setting is displayed. It is allowed to specify one of plain paper, heavy weight, and envelope. In stapling 905, a stapling setting is displayed. It is allowed to specify whether or not to perform stapling. In print preset 906, a print preset setting registered in the multifunction peripheral 101 is displayed. It is allowed to specify "none", "eco print", or "presentation use".

When eco print is selected as the print preset, setting contents of the eco print set in advance in the multifunction peripheral 101 are applied to the setting screen of the information processing apparatus 103. More specifically, the setting of the two-sided printing changes from "no" to "yes (two-side, long-edge)", and the setting of the paper size changes from "letter" to "A4".

In a case where the user wants to set the number of copies to 10 only for this printing operation, the user may change the number of copies specified in the number of copies 901 from "1" to "10".

When the user presses a print button 907, a print job generation instruction 602 is transmitted to instruct to generate a print job according to a combination of the specified normal print settings and the print preset. Subsequently, print data 603 is transmitted. When the user presses a cancel button 908, the printing operation on the information processing apparatus 103 is interrupted.

FIG. 10 is a diagram illustrating a printer information request transmitted from the information processing apparatus 103 to the multifunction peripheral 101 according to the first embodiment. This request is transmitted in 504 in FIG. 5. This request is Get-Printer-Attributes Request in IPP. URI indicating the address of the IPP printer is set in printer-uri.

FIG. 11 is a diagram illustrating a printer information response transmitted from the multifunction peripheral 101 to the information processing apparatus 103 according to the first embodiment. This response is transmitted in 505 in FIG. 5. Copies-supported 1101 indicates a supported range of the number of copies. In this example, it indicates that the range from 1 to 9999 is supported. Sides-supported 1102 indicates a supported range of two-sided printing. In this example, one-sided, two-sided-long-edge, and two-sided-short-edge are supported. Media-supported 1103 indicates a supported range of the paper type. In this example, "A4", "B5", and "letter" are supported. Finishing-col-database 1105 indicates a supported range of the finisher. In this example, "staple", "staple-top-left", "staple-bottom-left", "staple-top-right", "staple-bottom-right", "staple-dual-left", "staple-dual-top", "staple-dual-right", "staple-dual-bottom", and "none" are supported. Job-preset-supported indicates supported preset settings. In this example, "eco print" and "presentation use" are supported. Furthermore, as the content of "eco print", "two-sided (long-edge)" is set as the two-sided printing, and "A4" is set as the paper size. Furthermore, as the content of "presentation use", "one-sided" is set as the two-sided printing, "A4" is set as the paper size, "single" is set as the stapling type, and "top right" is set as the stapling position. Note that the setting of the stapling type "eco staple" and the setting of the storage box described above with reference FIG. 7 are not included here. This is because the attributes of the printer in terms of these functions are not defined in IPP although these functions are supported by the multifunction peripheral 101.

FIG. 12 illustrates a print job generation request, a print job generation response, and a print request transmitted and received between the information processing apparatus 103 and the multifunction peripheral 101 according to the first embodiment.

Reference numeral 1201 denotes a print job generation request. This request is transmitted in 602 in FIG. 6. A print setting is set in 1211. Here, the number of copies, the two-sided printing setting, the paper size, and the preset identification information are set.

Reference numeral 1202 denotes a print job generation response. This response is transmitted in 603 in FIG. 6. A job information is set in 1212. Here, information such as a job ID, a job status, and a job URI is set.

Reference numeral 1203 denotes a print request. This request is transmitted in 604 in FIG. 6. In 1213, job information such as a job ID for specifying a job is set. Note that print data is also transmitted together with this request.

Figure 13:
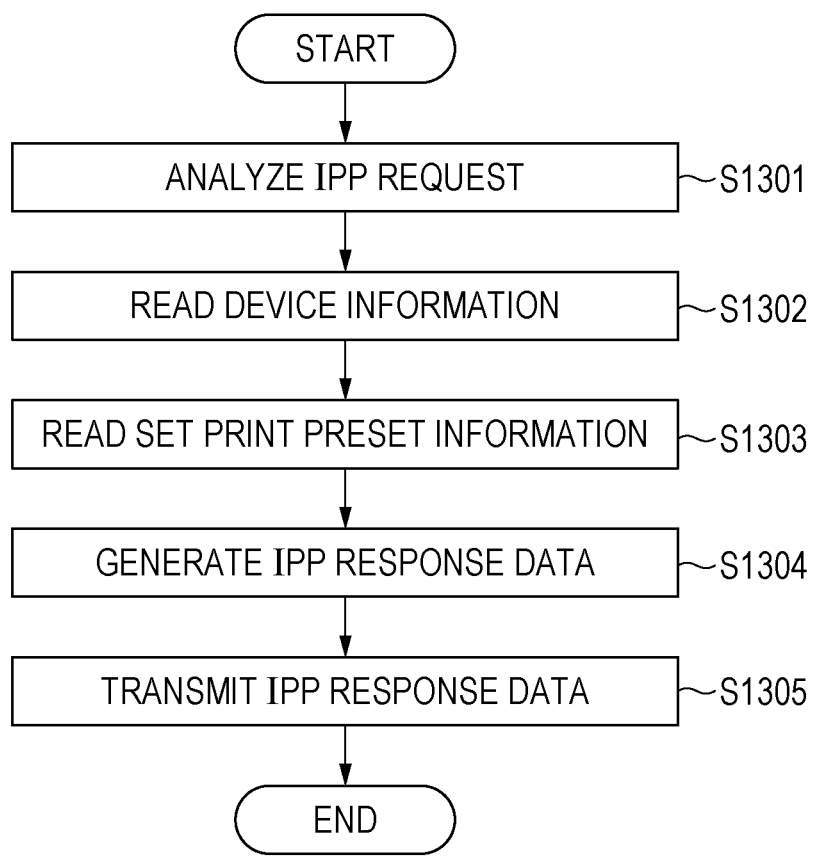
FIG. 13 is a flowchart illustrating a process performed when a multifunction peripheral receives a printer information request according to the first embodiment.

FIG. 13 is a flowchart illustrating a process performed when the multifunction peripheral 101 receives a printer information request 504 according to the first embodiment.

The IPP request analysis unit 301 of the multifunction peripheral 101 analyzes the IPP request received in S1301. In a case where the analysis result indicates that the IPP operation is the printer information request 504, the IPP device information management unit 302 of the multifunction peripheral 101 reads, in S1302, device information (printer configuration information) from the storage unit 305. In S1303, the IPP device information management unit 302 of the multifunction peripheral 101 reads print preset information set in the device from the storage unit 305. In S1304, the IPP response generation unit 304 of the multifunction peripheral 101 generates IPP response data from the device information and the print preset information. In S1305, the TCP/IP communication unit 312 of the multifunction peripheral 101 transmits the generated IPP response data.

Figure 14:
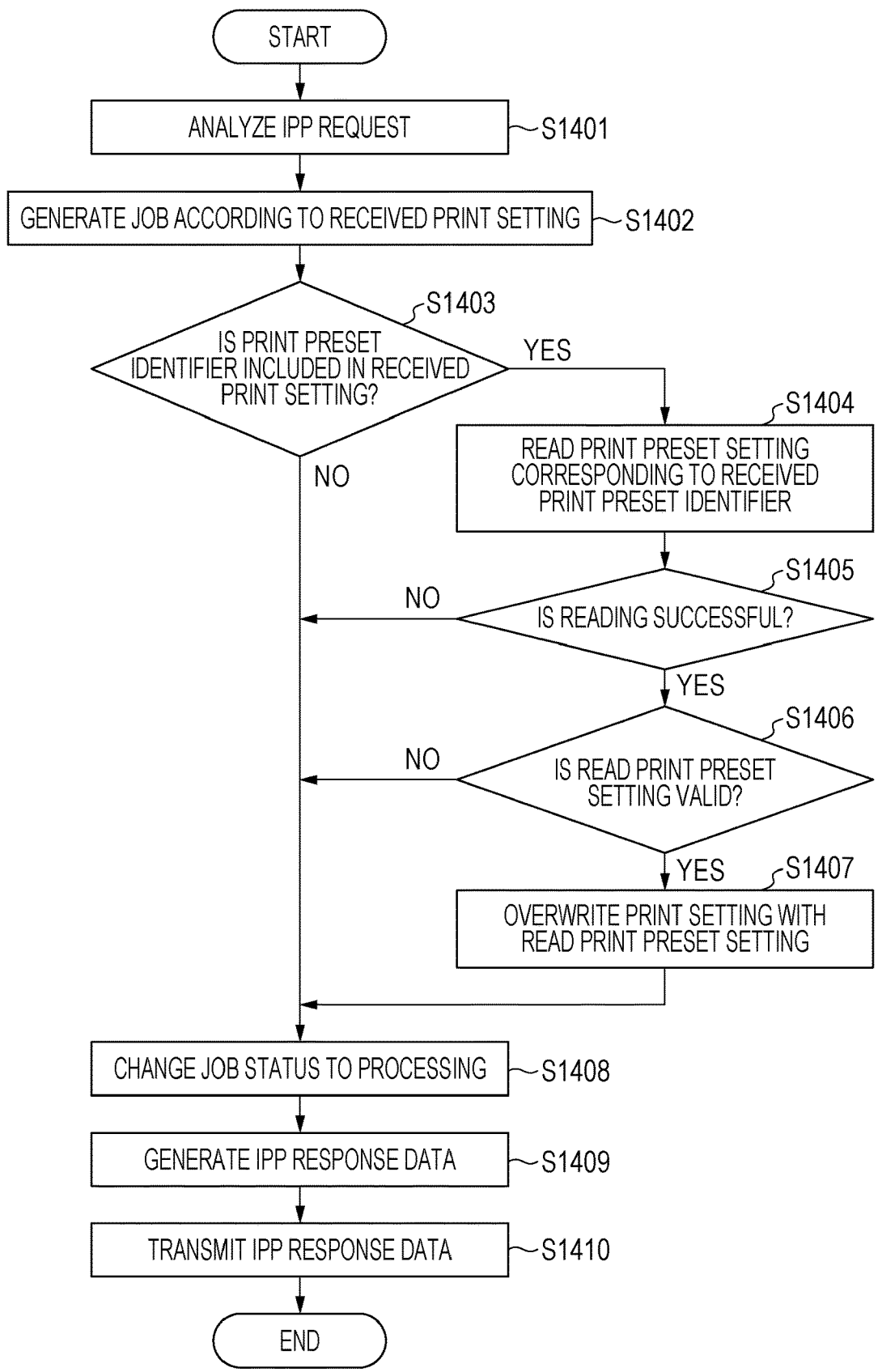
FIG. 14 is a flowchart illustrating a process performed when a multifunction peripheral receives a print job generation request according to the first embodiment.

FIG. 14 is a flowchart illustrating a process performed when the multifunction peripheral 101 receives the print job generation request 602 according to the first embodiment.

In S1401, the IPP request analysis unit 301 of the multifunction peripheral 101 analyzes the received IPP request. If the analysis result indicates that the received IPP request is the print job generation request 602, then in S1402, the IPP job information management unit 303 of the multifunction peripheral 101 generates a job based on the received print settings. In S1403, the IPP job information management unit 303 of the multifunction peripheral 101 determines whether the received print job generation request includes print preset identification information. If the print preset identification information is not included, the process proceeds to S1408.

If the print preset identification information is included, then in S1404, the IPP job information management unit 303 of the multifunction peripheral 101 reads print preset setting corresponding to the received print preset identification information from the storage unit 310. In a case where it is determined in S1405 that the reading has failed, the IPP job information management unit 303 of the multifunction peripheral 101 proceeds to S1408.

If the reading is successful, then in S1406, the IPP job information management unit 303 of the multifunction peripheral 101 determines whether the read print preset setting is set to be enabled or disabled.

In a case where the print preset setting is disabled, the process proceeds to S1408. If the print preset setting is enabled, the IPP job information management unit 303 of the multifunction peripheral 101 reflects, in step S1407, the read print preset setting on the job and proceeds to S1408.

In S1408, the IPP job information management unit 303 of the multifunction peripheral 101 changes the job status to processing. In S1409, the IPP response generation unit 304 of the multifunction peripheral 101 generates IPP response data from the job information. In S1410, the TCP/IP communication unit 312 of the multifunction peripheral 101 transmits the generated IPP response data.

Figure 15:
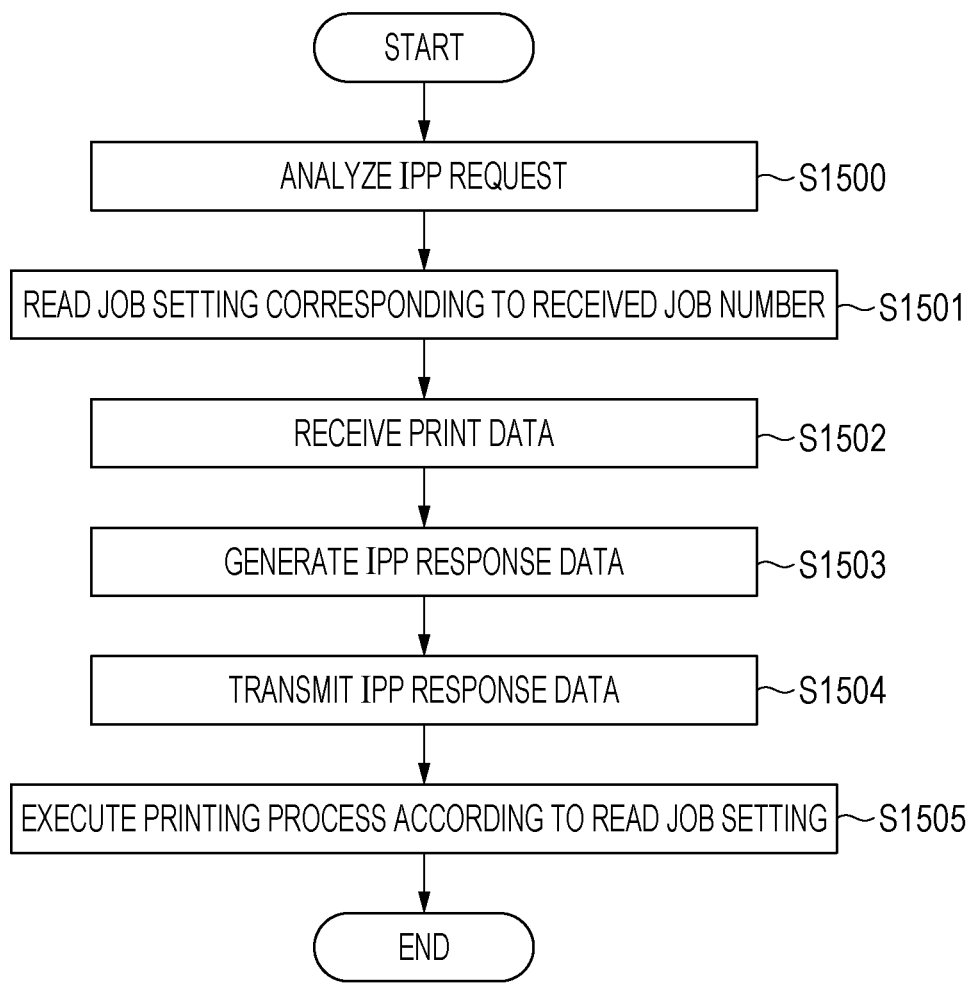
FIG. 15 is a flowchart illustrating a process performed when a multifunction peripheral receives a print request according to the first embodiment.

FIG. 15 is a flowchart illustrating a process performed when the multifunction peripheral 101 receives the print request 604 according to the first embodiment.

In S1500, the IPP request analysis unit 301 of the multifunction peripheral 101 analyzes the received IPP request. If the analysis result indicates that the received IPP request is the print request 604, then in S1501, the IPP job information management unit 303 of the multifunction peripheral 101 reads a print setting corresponding to the received job number. In S1502, the IPP job information management unit 303 of the multifunction peripheral 101 receives the print data. In S1503, the IPP response generation unit 304 of the multifunction peripheral 101 generates IPP response data from the received information. In S1504, the TCP/IP communication unit 312 of the multifunction peripheral 101 transmits the generated IPP response data. In S1505, the print processing unit 322 of the multifunction peripheral 101 prints the received print data.

When printing is performed using IPP in a general-purpose print service, a user is allowed to specify a print preset name thereby making it possible to specify a print setting that is not supported by IPP.

As described above, in a case where the print preset of the multifunction peripheral 101 is applied, there is a possibility that the normal print setting transmitted from the information processing terminal 103 conflicts with the print preset setting set by the multifunction peripheral 101.

In such a case, which setting should be given priority depends on the case. A user may want to give priority to the normal print setting transmitted from the information processing apparatus 103 for cases described below.

Depending on the situation, although a user wants to use the print setting of print preset "eco print", the user wants to specify the two-sided printing as "yes (two-sided, short-edge)" only for the preset printing operation instead of "yes (two-sided, long-edge)" which is set in "eco print". In such a case, after the user selects the preset "eco print" on the information processing terminal 103, the user may change only the setting of two-sided printing to "yes (two-sided, short-edge)". If the user executes printing in this state, a conflict in terms of the two-sided printing occurs in the multifunction peripheral 101. In this case, the user's intention is to give priority to the normal print setting transmitted from the information processing terminal 103.

There is a case where the user wants to give priority to the print preset setting registered in the multifunction peripheral 101, instead of the normal print setting transmitted from the information processing apparatus 103. Such a situation may occur, for example, in cases described below.

It is assumed here that it is set in advance such that when stapling is set to be performed on a normal print setting screen, "single-stapling at the top left" is selected by default. A further description is given below by way of example for a case where a user wants to select the print preset "presentation use" and use the staple setting "single-staple at the top right" ("finishing-template"="staple-top-right"). Since the user wants to perform stapling, the user select the print preset "presentation use", and then sets the stapling setting "Yes" on the normal print setting screen. In this case, a conflict occurs in the staple position, but the user's intention is to give priority to the print preset. This may occur when the information processing terminal 103 does not support all print attributes notified by the multifunction peripheral 101 in 1106. In the present embodiment, when the staple setting is performed via the information processing terminal 103, it is allowed to select only "Yes" or "No", and it is not allowed to specify the position and the number of staples.

To handle the above situation, in the first embodiment, priority is given to the print preset setting in the multifunction peripheral 101.

Figure 16:
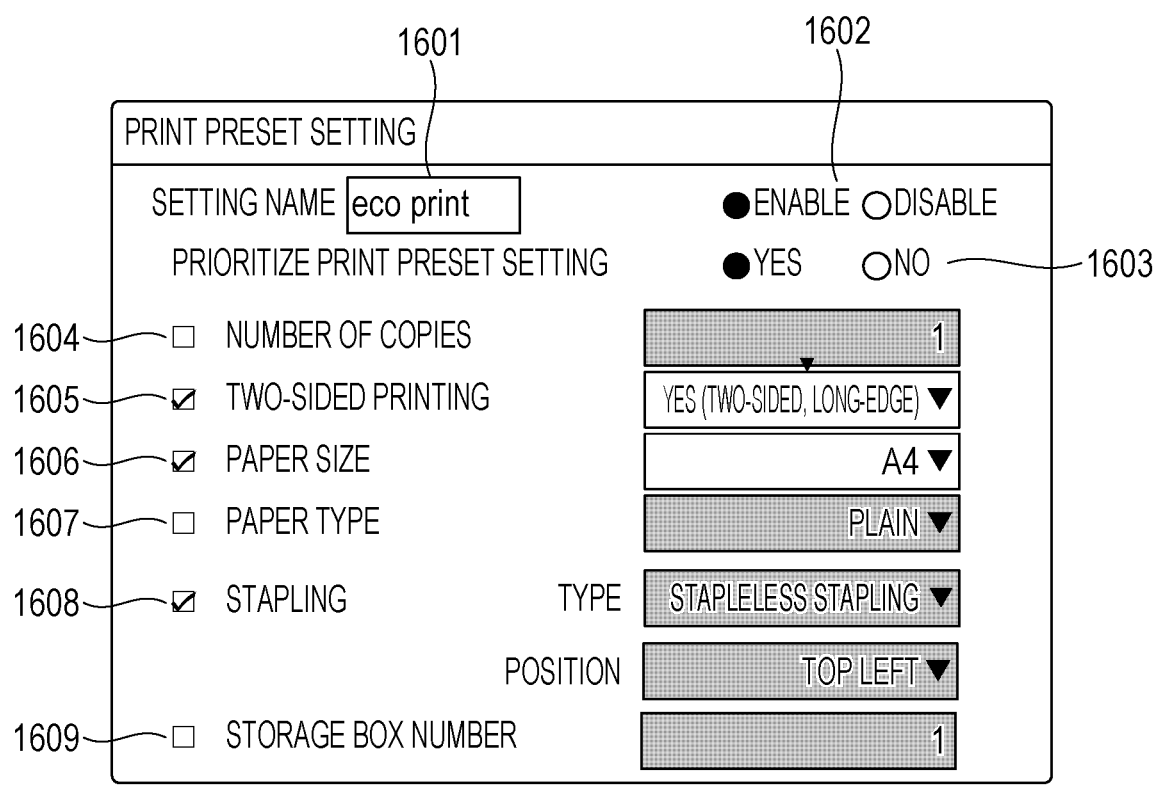
FIG. 16 is a diagram illustrating an operation screen for performing a print preset setting on a multifunction peripheral according to the first embodiment.

FIG. 16 is a diagram illustrating an operation screen for performing a print preset setting on a multifunction peripheral 101 according to the first embodiment.

The operation screen for performing the print preset setting in the multifunction peripheral 101 has been described above with reference to FIG. 8, and thus only differences will be described below with reference to FIG. 16.

"Prioritize print preset setting" 1603 indicates which of settings is given priority when the normal print setting transmitted from the information processing terminal 103 to the multifunction peripheral 101 conflicts with the print preset setting in the print job generation request 602. If this setting is set as "Yes", the print preset setting of the multifunction peripheral 101 is given priority when the conflict occurs. However, if this setting is set as "No", the print setting transmitted from the information processing apparatus 103 is given priority when the conflict occurs.

FIG. 17 is a diagram illustrating a print job generation request transmitted by the portable terminal 103 to the multifunction peripheral 101 according to the first embodiment. Reference numeral 1701 denotes an example of a request in which the normal print setting of the information processing apparatus 103 is prioritized, that is, "No" is selected in the "prioritize print preset setting" 1603. After selecting the preset "eco print" on the information processing terminal 103, a user changes the setting two-sided printing to "yes (two-sided, short-edge)". In this case, a request attribute is set as in 1702. Here, "sides" is set not as "two-sided-long-edge", which is the setting of the preset "eco print", but is set as "two-sided-short-edge" according to the selection made by a user on the information processing terminal 103.

Reference numeral 1711 denotes an example of a request in which the print preset in the multifunction peripheral 101 is prioritized, that is, "Yes" is selected in the "prioritize print preset setting" 1603. After selecting the print preset "presentation use" on the information processing terminal 103, the user changes the stapling setting to "Yes". When "Yes" is selected in the staple setting on the information processing apparatus 103, only "single-stapling at the top left" is supported. On the other hand, in the case of the print preset, "single-stapling at the top right" is supported. In this case, a request attribute is set as in 1712. In the setting of the "staple", not "staple-top-left" specified on the information processing apparatus 103, but "staple-top-right" specified in the print preset "presentation use" is set.

Figure 18:
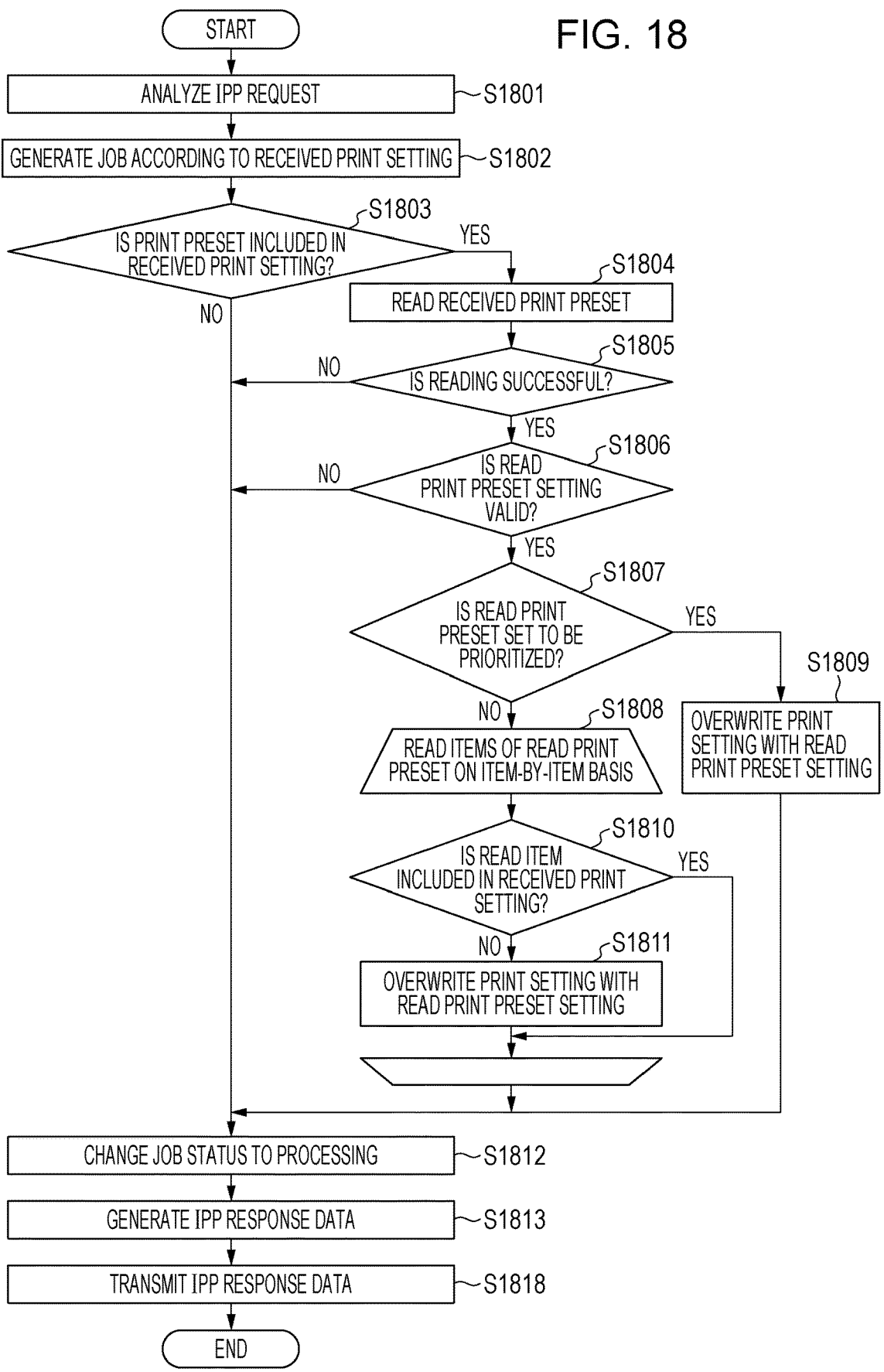
FIG. 18 is a flowchart illustrating a process performed when a multifunction peripheral receives a print job generation request according to the first embodiment.

FIG. 18 is a flowchart illustrating a process performed when the multifunction peripheral 101 receives a print job generation request according to the first embodiment.

The IPP request analysis unit 301 of the multifunction peripheral 101 analyzes the IPP request received in S1801. If the analysis result indicates that the received IPP request is the print job generation request 602, then in S1802, the IPP job information management unit 303 of the multifunction peripheral 101 generates a job based on the received print settings. In S1803, the IPP job information management unit 303 of the multifunction peripheral 101 determines whether the received print job generation request includes print preset identification information. If the print preset identification information is not included, the process proceeds to S1812.

If the print preset identification information is included, then in S1804, the IPP job information management unit 303 of the multifunction peripheral 101 reads print preset setting corresponding to the received print preset identification information from the storage unit 310. In a case where it is determined in S1805 that the reading has failed, the IPP job information management unit 303 of the multifunction peripheral 101 proceeds to S1812.

If the reading is successful, then in S1806, the IPP job information management unit 303 of the multifunction peripheral 101 determines whether the read print preset setting is set to be enabled or disabled. In a case where the print preset setting is disabled, the process proceeds to S1812.

If the print preset setting is enabled, then in S1807, the IPP job information management unit 303 of the multifunction peripheral 101 determines whether the item of "prioritize print preset setting" in the read print preset setting is "Yes" or "No". If "Yes", then in S1809, the IPP job information management unit 303 of the multifunction peripheral 101 overwrites the print settings with the read print preset, and the process proceeds to S1812.

If "No", then in S1808, the IPP job information management unit 303 of the multifunction peripheral 101 reads out the setting items of the read print preset setting on an item-by-item basis. In S1810, the IPP job information management unit 303 of the multifunction peripheral 101 determines whether the read setting item is included in the received normal print settings. If it is included, no processing is performed but a next setting item is read. If it not included, then in S1811, the IPP job information management unit 303 of the multifunction peripheral 101 overwrites the print settings with the print preset for the read setting item. When all setting items of the print preset have been read in S1808, the process proceeds to S1812.

In S1812, the IPP job information management unit 303 of the multifunction peripheral 101 changes the job status to processing. In S1813, the IPP response generation unit 304 of the multifunction peripheral 101 generates IPP response data from the job information. In S1818, the TCP/IP communication unit 312 of the multifunction peripheral 101 transmits the generated IPP response data.

The first embodiment provides advantages as described below. In the first embodiment, by specifying a print preset, it is possible to select a print setting that is not supported by IPP, which is a general-purpose print service. However, when the print preset setting registered in the multifunction peripheral 101 conflicts with the normal print setting set on the information processing terminal 103, it is impossible to determine which print setting is given priority. To handle this situation, the first embodiment provides a setting for determining which setting has priority thereby making it possible to apply a print setting desired by a user.

Second Embodiment

In the first embodiment described above, when the normal print setting set on the information processing terminal 103 and the print preset setting set in the multifunction peripheral 101 conflict with each other, the processing is performed according to the priority setting specified in the print preset of the multifunction peripheral 101. In a second embodiment described below, a determination as to whether or not priority is given to a print preset is made depending on the type of the information processing terminal 103. Note that the type of the information processing terminal is a type of an operating system (OS) of the information processing terminal. The print attributes that can be supported differ depending on the type of the information processing terminal. In an information processing terminal of a type in which the supported print attributes are insufficient, it may be desirable that the print preset is prioritized and unsupported print settings are complemented. For example, in the information processing terminal 103 of a type in which when stapling setting is performed in normal print setting, it is allowed to make a selection only as to whether stapling is performed or not, it is desirable to give priority to the print preset. On the other hand, in the case of a type of information processing terminal that supports sufficiently many print attributes, it is desirable to give priority to normal print settings set on the information processing terminal 103. For example, in a case where the information processing terminal 103 allows it, in the stapling, to make a selection not only as to whether the stapling is "performed" or "not performed", but also make a selection as to the stapling position, it is desirable not to give priority to the print preset. Thus, the second embodiment is described below for a case where when a conflict occurs in setting, a determination is made as to which setting is prioritized depending on the type of the information processing terminal of the transmission source. In the second embodiment, only differences from the above-described first embodiment are described. Unless otherwise specified, the configuration/procedure is the same as in the first embodiment.

Figure 19:
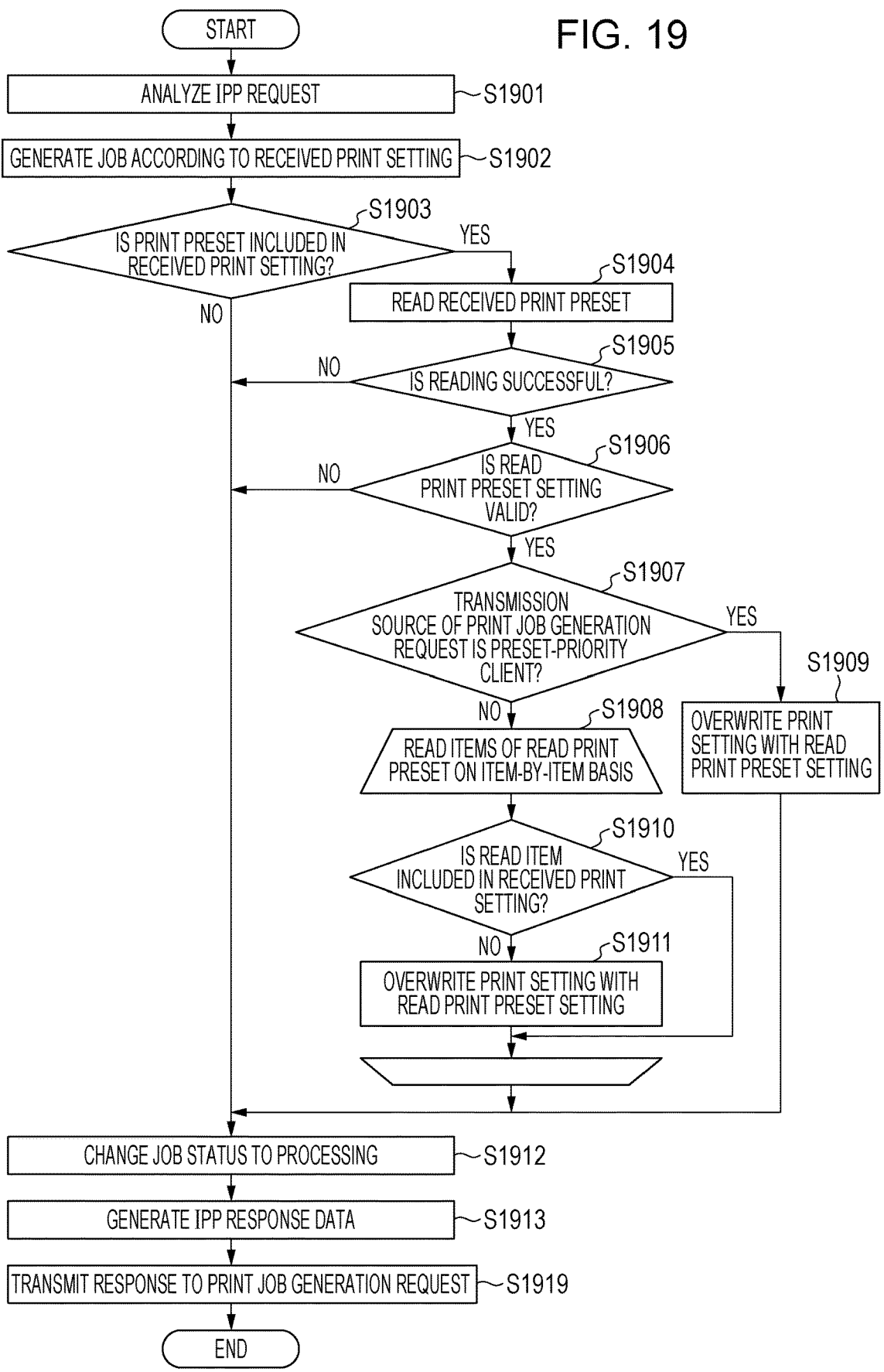
FIG. 19 is a flowchart illustrating a process performed when a multifunction peripheral receives a print job generation request according to a second embodiment.

FIG. 19 is a flowchart illustrating a process performed when the multifunction peripheral 101 receives a print job generation request according to the second embodiment.

In this flowchart, S1907 is different from S1807 in the flowchart of FIG. 18 in the first embodiment, and thus only the difference will be described below. In the first embodiment, in S1807, the IPP job information management unit 303 of the multifunction peripheral 101 determines whether "prioritize print preset setting" is set as "Yes" or "No" in the read print preset. However, in the second embodiment, in S1907, the IPP job information management unit 303 of the multifunction peripheral 101 determines whether the transmission source of the print job generation request is a print preset priority client. Here, the print preset priority client refers to a terminal in which it is desirable to give priority to the print preset because print attributes supported on the information processing terminal are not sufficient. If the information processing terminal is a print preset priority client, then in S1909, the IPP job information management unit 303 of the multifunction peripheral 101 overwrites the print settings with the read print preset setting, and proceeds to S1912. If the information processing terminal is not a preset priority client, then in S1908, the IPP job information management unit 303 of the multifunction peripheral 101 reads out the setting items of the read print preset on an item-by-item basis.

The determination in S1907 as to whether the transmission source of the print job generation request is a print preset priority client is made based on "user agent" information included in the print job generation request.

The second embodiment provides advantages as described below. In the first embodiment, when a print preset setting registered in the multifunction peripheral conflicts with a normal print setting set on the information processing terminal 103, the determination as to which print setting is given priority is made according to a setting made by a user. However, it is troublesome for the user to select which setting has priority. To handle this situation, in the second embodiment, the multifunction peripheral automatically determines which setting has priority by determining the type of the information processing terminal 103. This makes it possible to eliminate the setting conflict without the user selecting the priority setting.

Third Embodiment

In the first embodiment, the determination as to which setting is given priority is made according to the priority setting provided in the print preset of the multifunction peripheral 101. However, alternatively, when a setting conflict occurs, the determination as to which setting is given priority may be made depending on the setting item in which the conflict occurs. For example, it is allowed to set the stapling setting in more detail in the print preset (in terms of the stapling position, the number of staples, etc.) than in the normal print setting set on the information processing terminal 103, and thus, as for the items of the stapling setting, it may be desirable to give priority to the print preset setting. Setting items which are given priority may be determined in advance depending on the properties of the respective setting items of the print preset.

A third embodiment discloses an example of a technique to achieve such a purpose. In the third embodiment, only differences from the above-described second embodiment are described. Unless otherwise specified, the configuration/procedure is the same as in the second embodiment.

In the third embodiment, setting of "print preset priority" specifying a setting item that is to be preferentially reflected is determined fixedly in advance based on the property of the setting item of the print preset (for example, a property that allows a corresponding setting item to be defined in detail). By way of example, it is assumed that the multifunction peripheral 101 determines the property of the setting item.

Figure 20:
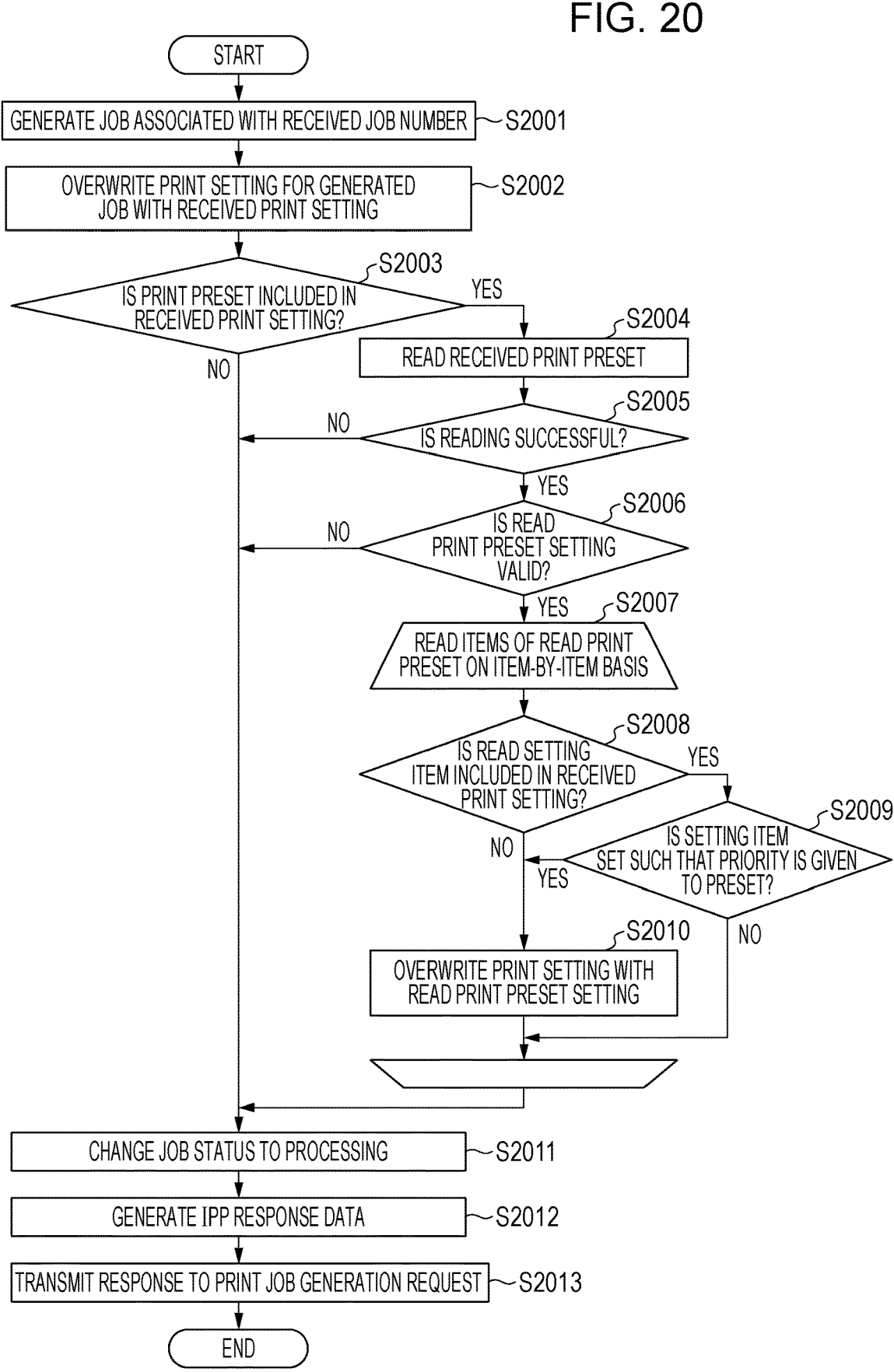
FIG. 20 is a flowchart illustrating a process performed when a multifunction peripheral receives a print job generation request according to a third embodiment.

FIG. 20 is a flowchart illustrating a process performed when the multifunction peripheral 101 receives a print job generation request according to the third embodiment.

The processing flow up to S2006 is the same as that up to S1806 in FIG. 18 in the first embodiment, and thus only the different part following S2006 will be described below.

It is assumed that the IPP job information management unit 303 of the multifunction peripheral 101 has a function of determining whether or not priority is given to setting items of the print preset on an item-by-item basis.

The IPP job information management unit 303 of the multifunction peripheral 101 reads out the setting items of the read print preset setting on an item-by-item basis. In S2008, the IPP job information management unit 303 of the multifunction peripheral 101 determines whether the read setting item is included in the received print setting. If it is not included, then in S2010, the IPP job information management unit 303 overwrites the print settings with the print preset read in S2007. If the read setting item is included in the received print setting, then in S2009, the IPP job information management unit 303 determines whether the setting item has print preset priority. If it has print preset priority, then in S2010, the IPP job information management unit 303 overwrites the print setting with the setting read in S2007. If the setting item does not have print preset priority, the IPP job information management unit 303 does not perform any processing and reads a next setting item. When repetition process following S2007 is completed for all the print preset setting items, a process is performed which is the same as in the first embodiment shown in the flowchart of FIG. 18.

The third embodiment provides advantages as described below. In the first embodiment, when a print preset setting registered in the multifunction peripheral conflicts with a normal print setting set on the information processing terminal 103, the determination as to which print setting is given priority is made according to a setting made by a user. However, it is troublesome for the user to make this setting. In the third embodiment, to handle the above situation, one or more setting items that are to be preferentially reflected are determined in advance based on the properties of setting items of the print preset. When a conflict occurs, priority is given according to the determination made in advance. This makes it possible to eliminate the setting conflict without the user performing the priority setting.

Fourth Embodiment

In the third embodiment described above, setting items that are to be preferentially reflected are fixedly determined based on the properties of setting items of the print preset. However, instead of fixedly determining which setting item is given priority in the event of a conflict, a print preset may be provided with another selection item (priority item setting) which is set by a user in advance for each selection item so as to specify whether or not to give priority to the setting item.

A fourth embodiment discloses an example of a specific process for achieving the above purpose.

Figure 21:
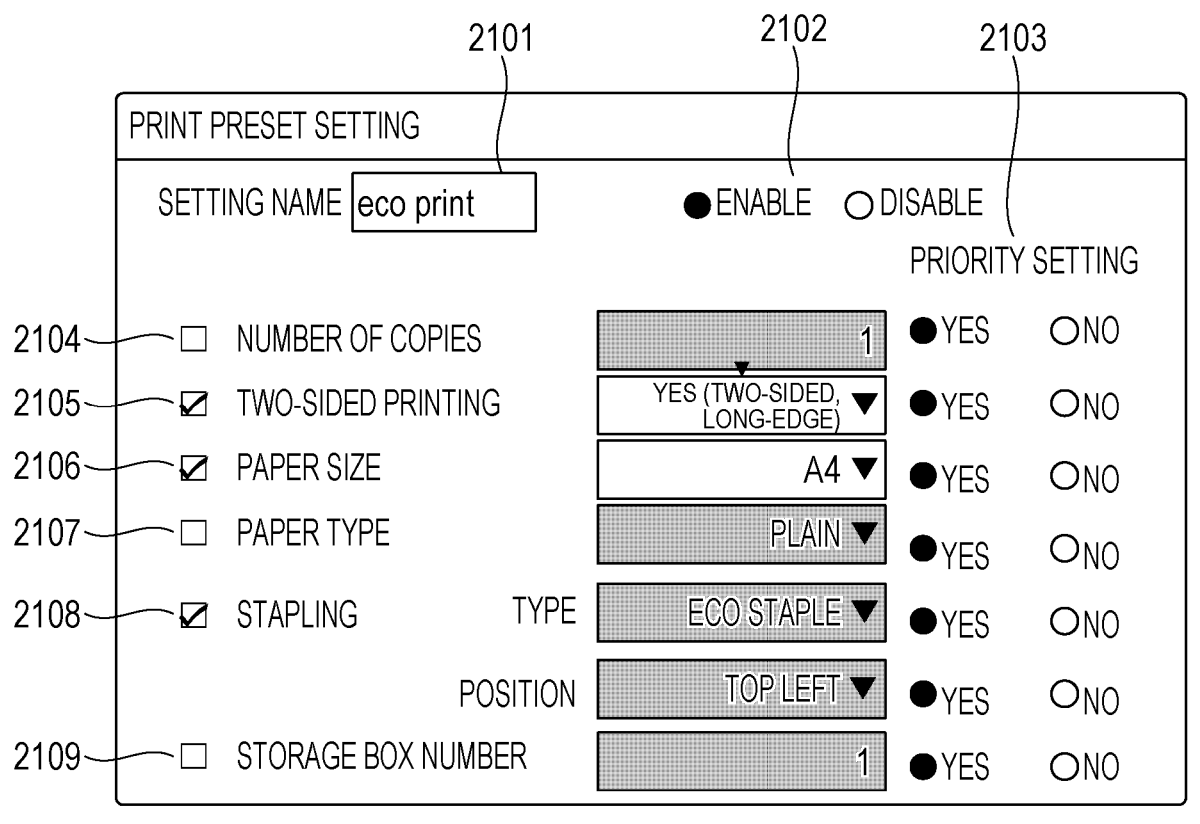

FIG. 21 is a diagram illustrating an operation screen for performing a print preset setting on a multifunction peripheral 101 according to the fourth embodiment.

The operation screen for performing the print preset setting in the multifunction peripheral 101 has been described above with reference to FIG. 8, and thus only differences will be described below with reference to FIG. 21.

The "priority setting" setting 2103 specifies whether priority is given to the normal print setting set by the information processing terminal 103 on the multifunction peripheral 101 in the print job generation request 602 or to the print preset set in the multifunction peripheral 101 in the event of a conflict between these settings. If this setting is set as "Yes", the print preset is given priority when the conflict occurs. However, if this setting is set as "No", the normal print setting is given priority when the conflict occurs. This "priority setting" setting 2103 can be set for each setting item.

Figure 22:
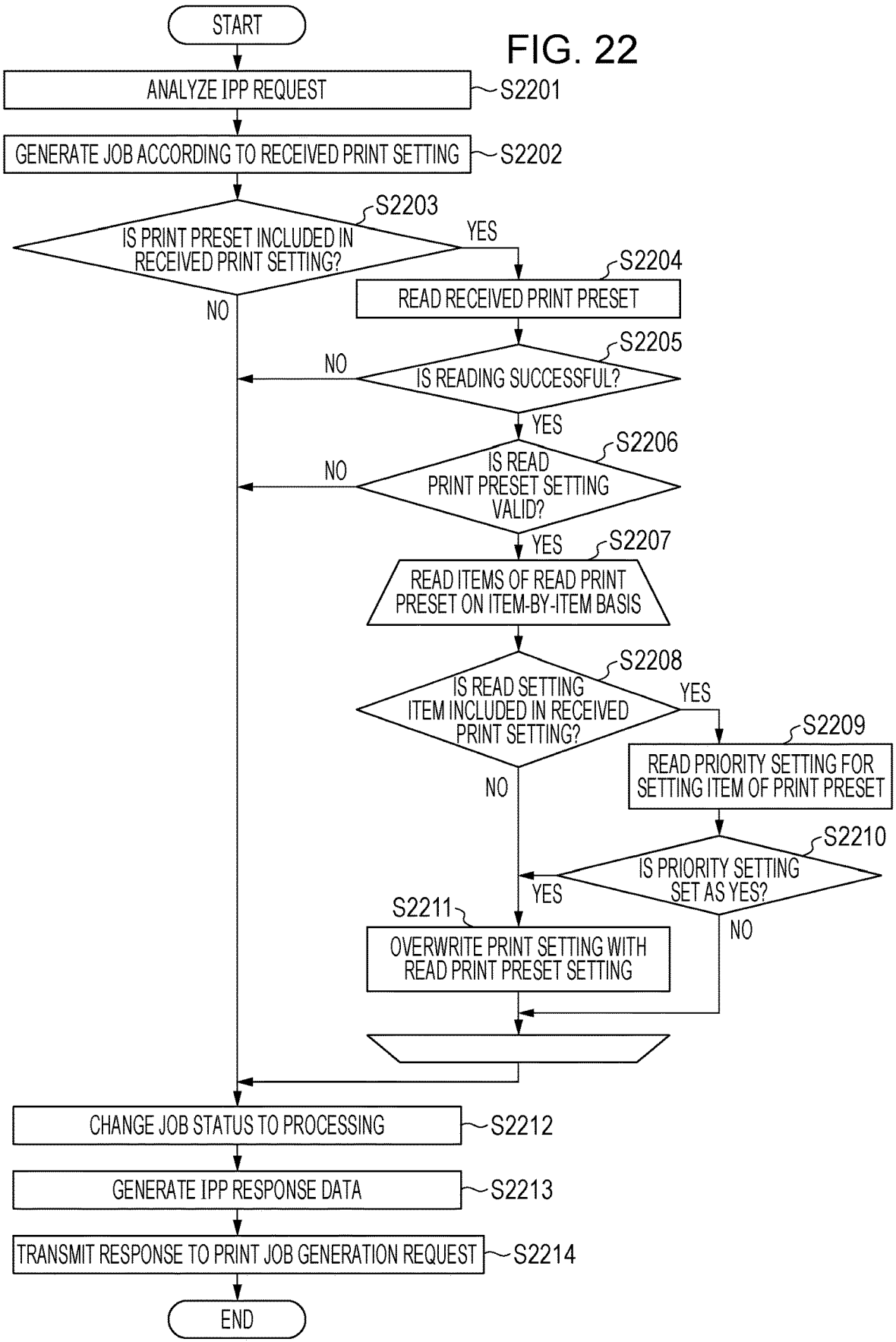
FIG. 22 is a flowchart illustrating a process performed when a multifunction peripheral receives a print job generation request according to the fourth embodiment.

FIG. 22 is a flowchart illustrating a process performed when the multifunction peripheral 101 receives a print job generation request according to the fourth embodiment.

In this flowchart, S2209 is different from S2009 in the third embodiment, and thus only the difference will be described below.

In the flowchart shown in FIG. 22, in S2209, the IPP job information management unit 303 reads out the priority setting of the setting items from the storage unit 305. In a case where the read priority setting specifies "Yes", in 52211, the IPP job information management unit 303 overwrites the print setting with the setting read in S2207. If the priority setting is not "Yes", the IPP job information management unit 303 does not perform any processing and reads a next setting item. When a repetition process in S2207 is completed for all the print preset setting items, a process is performed which is the same as in the third embodiment shown in the flowchart of FIG. 20.

The fourth embodiment provides advantages as described below. In the third embodiment described above, when the print preset registered in the multifunction peripheral and the print setting transmitted form the information processing terminal 103 conflict with each other, priority is given according to the determination made fixedly based on the properties of the setting items. In the fourth embodiment, the priority is determined not fixedly but according to the selection made by a user. This makes it possible to apply the print setting desired by the user.

OTHER EMBODIMENTS

In the first and fourth embodiments, the priority setting is provided, by way of example but not limitation, in the print preset. However, the priority setting may be defined in a setting different from the print preset.

In the embodiments described above, the determination is made as to whether priority is to be given to the print preset. Alternatively, the determination may be made as to whether priority is to be given to the normal print setting set on the information processing terminal 103.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2019-074414, filed Apr. 9, 2019 which is hereby incorporated by reference herein in its entirety.

What is claimed is:

1. A printing apparatus configured to communicate with an information processing apparatus, the printing apparatus comprising:
one or more processors; and at least one memory storing executable instructions, which when executed by the one or more processors, cause the printing apparatus to perform operations comprising:

registering first setting information related to printing;

providing a setting screen for performing a priority setting indicating whether the first setting information is prioritized;

performing the priority setting based on an operation received from a user through the setting screen;

receiving second setting information related to printing set on the information processing apparatus and information about the first setting information from the information processing apparatus;

generating a print job using at least one of the second setting information and the first setting information, wherein for a setting item having a different setting value between the first setting and the second setting, a setting value included in either the first setting or the second setting is used based on the priority setting; and executing the print job.

2. The printing apparatus according to claim 1, setting screen further receives the first setting information.

3. The printing apparatus according to claim 1, wherein the operations further comprise:

determining a type of the information processing apparatus; and generating the print job using either one of the setting included in the first setting information or the setting included in the second setting information according to the determined type of the information processing apparatus.

4. The printing apparatus according to claim 3, wherein the type of the information processing apparatus is a type of an operating system (OS) of the information processing apparatus.

5. The printing apparatus according to claim 1, wherein the first setting information includes one or more setting items, wherein the operations further comprise:

setting a property of each of the one or more setting items; and generating the print job using either one of the setting included in the first setting information or the setting included in the second setting information based on the determined property.

6. The printing apparatus according to claim 1, wherein the first setting information and the second setting information each include one or more setting items, wherein the operations further comprise:

in a case where a setting of one of the setting items included in the first setting information and a setting of one of the setting items included in the second setting information conflict with each other, accepting from a user a priority item setting indicating whether priority is to be given to the setting of the setting item in the first setting information or the setting of the setting item in the second setting information; and generating the print job using either one of the setting item included in the first setting information or the setting item included in the second setting information based on the priority item setting.

7. The printing apparatus according to claim 1, wherein the first setting information includes a print setting related to a detail of a function of the printing apparatus, and the second setting information includes a print setting shared by different types of printing apparatuses in a general-purpose print service.

8. The printing apparatus according to claim 1, wherein the printing apparatus communicates with the information processing apparatus based on IPP (Internet Printing Protocol).

9. A system comprising:

an information processing apparatus; and a printing apparatus according to claim 1, wherein the information processing apparatus comprises:

one or more processors; and at least one memory storing executable instructions, which when executed by the one or more processors, cause the information processing apparatus to perform operations comprising:

transmitting second setting information related to printing set on the information processing apparatus to the printing apparatus.

10. The printing apparatus according to claim 1, wherein the first setting information includes a plurality of setting values respectively corresponding to a plurality of setting items related to printing.

11. The printing apparatus according to claim 10, wherein a plurality of pieces of the first setting information are registered in the printing apparatus, and the priority setting can be performed for each of the pieces of the first setting information.

12. The printing apparatus according to claim 1, wherein in a case where the first setting information is transmitted to the information processing apparatus, the first setting information is reflected on a print setting screen of the information processing apparatus.

13. The printing apparatus according to claim 1, wherein a setting that is settable according to the first setting information is not settable according to the second setting information.

14. The printing apparatus according to claim 1, wherein the operations further comprise:

based on an acquisition request from the information processing apparatus, transmitting identification information of the first setting information to the information processing apparatus; and receiving the second setting information related to printing set on the information processing apparatus and the identification information from the information processing apparatus.

15. The printing apparatus according to claim 14, wherein the identification information is a print preset name.

16. The printing apparatus according to claim 14, wherein plural pieces of identification information including the identification information of the first setting information are transmitted to the information processing apparatus, and identification information selected by the information processing apparatus is received.

17. A method for a printing apparatus that communicates with an information processing apparatus, the method comprising:

registering first setting information related to printing;

providing a setting screen for performing a priority setting indicating whether the first setting information is prioritized;

performing the priority setting based on an operation received from a user through the setting screen;

receiving second setting information relating to printing set on the information processing apparatus and information about the first setting information from the information processing apparatus;

generating a print using at least one of the second setting information and the first setting information, wherein for a setting item having a different setting value between the first setting and the second setting, a setting value included in either the first setting or the second setting is used based on the priority setting; and executing the print job.

18. A non-transitory computer-readable storage medium storing a program including executable instructions, which when executed by one or more processors of a printing apparatus, cause the printing apparatus to perform the method according to claim 17.

\* \* \* \* \*